(12) United States Patent
Lin

(10) Patent No.: US 6,311,129 B1
(45) Date of Patent: Oct. 30, 2001

(54) POSITIONING PROCESS AND SYSTEM THEREOF

(75) Inventor: Ching-Fang Lin, Chatsworth, CA (US)

(73) Assignee: American GNC Corporation, Simi Valley, CA (US)

( * ) Notice: Subject to any disclaimer, the term of this patent is extended or adjusted under 35 U.S.C. 154(b) by 0 days.

(21) Appl. No.: 09/287,574

(22) Filed: Apr. 6, 1999

(51) Int. Cl.[7] .................................................. G01S 5/02
(52) U.S. Cl. ......................... 701/214; 701/207; 701/213; 342/357; 342/422
(58) Field of Search .................................. 701/214, 207, 701/213, 200; 342/357, 442; 375/207; 380/34

(56) References Cited

U.S. PATENT DOCUMENTS 5,657,025 * 8/1997 Ebner et al. ........................ 342/357

* cited by examiner

Primary Examiner—William A. Cuchlinski, Jr.
Assistant Examiner—Arthur Donnelly
(74) Attorney, Agent, or Firm—Raymond Y. Chan; David and Raymond Patent Group

(57) ABSTRACT

A positioning method and a system are disclosed for measuring a position of a vehicle on land, air, and space, using measurements from a global positioning system receiver and an inertial measurement unit. In the present invention, an integrated Kalman filter processes the all-available measurements of the global positioning system: pseudorange, delta range, carrier phase, and the solution of an inertial navigation system. The integrated Kalman filter is a multi-mode, robust kalman filter, in which optimal integrated mode is selected based on the measurement availability and filter stability. The high accurate solution of the inertial navigation system, which is corrected by the Kalman filter, is used to aid on-the-fly resolution of the carrier phase integer ambiguity of global positioning system in order to incorporate the carrier phase measurements into the Kalman filter, and to aid the carrier phase and code tracking loops of the receiver of the global positioning system to improve the receiver jamming and high dynamic resistance.

24 Claims, 11 Drawing Sheets

POSITIONING PROCESS AND SYSTEM THEREOF

FIELD OF THE PRESENT INVENTION

The present invention relates to positioning process and system, and more particularly to a GPS/IMU process and system thereof to improve the navigation accuracy of a GPS guided vehicle on land, air, and space.

BACKGROUND OF THE PRESENT INVENTION

To meet the future applications, it is needed to develop a reliable, accurate, miniaturized, low cost, kinematic global positioning system/inertial measurement unit integrated navigation system which is capable of operating in a high dynamic flight environment against a mixture of multi-type global positioning system (GPS) signal loss or deterioration, and improving navigation accuracy of GPS guided vehicle.

A major way of reducing cost of a navigation system is to use cheaper sensors and components that make the integrated navigation, and guidance and control system designs all the more challenging. Traditionally, guidance and navigation systems used for guided vehicle are mainly inertial navigation systems (INS) which is composed of an inertial measurement unit (IMU) and a processor. An important advantage of INS guidance is independence from external support. Unlike other types of guidance, INS devices can not be jammed or fooled by deceptive countermeasures. Unfortunately, INS guidance cannot provide high accuracy at long ranges. Inertial sensors are subject to errors that tend to accumulate over time—the longer the flight time, the greater the inaccuracy. The cost of developing and manufacturing a gyroscope increases as its level of accuracy improves. High-quality gyroscopes are difficult to manufacture, and only a relatively small number of companies around the world are capable of producing them. In part, this reflects the limited market for gyroscopes suitable for use in a highly accurate INS. Therefore, the inherent inaccuracy of the INS means that it cannot be the sole guidance system for a highly accurate tactical missile. Additional inputs are needed to correct for INS errors.

More recent development s in satellite navigation techniques are making possible the precise navigation at low cost. Efforts are now under way to develop integrated GPS/IMU navigation and guidance systems, suitable for use in high-jamming and high-dynamic flight environments. One implication of integrated GPS/IMU packages is that lower-cost, more easily manufactured IMU sensors can be used. This can result in significant savings.

Therefore, the technology trends for inertial sensors, GPS accuracies, and integrated GPS/IMU systems, including considerations of jamming and high dynamic, will lead to the one meter accuracy. The technical challenges come from the improvement of inertial and GPS sensor performance and the optimal integration of these sensors in the software and hardware designs. For inertial sensors, trend-setting sensor technologies are fiber-optic gyros, silicon micromechanical gyros, resonating beam accelerometers, and silicon micromechanical accelerometers. The utilization of these techniques is resulting in low-cost, high reliability, small size, and light weight for inertial sensors and for the systems into which they are integrated.

For the GPS accuracies, the current 16-meter (SEP, spherical error probable) specified accuracy, or 8 to 10-meter (CEP, circular error probable) observed accuracy of the GPS PPS (Precise Positioning Service) provides impressive navigation performance especially when multiple GPS measurements are combined into a robust centralized Kalman filter to update an INS. The filter provides an opportunity dynamically to calibrate the GPS errors, as well as, the inertial errors, and when properly implemented, CEPs far better than 8 meters can be obtained. For example, for precision guidance and automated aircraft landings, the requirement for accuracy of the integrated navigation systems is less than 3 meters or even better.

The trend towards improvement of accuracies of the integrated navigation systems is to utilize kinematic GPS and develop advanced fully-coupled kinematic GPS/IMU integrated systems in which both GPS receiver code and carrier tracking loops are aided with the inertial sensor information. Therefore, the measurement accuracy and anti-jamming capability of the GPS receiver can be dramatically enhanced and increased. Rapid carrier integer cycle ambiguity search and resolution, cycle slip detection and isolation procedures can also be completed within a few seconds through use of the inertial aiding information. In addition, GPS specified and observed current accuracies can be improved due to various stages of the wide area GPS enhancements.

As a result, the design and development of kinematic GPS/IMU integrated navigation systems is extremely challenging. Specifically, the hardware sensors and software algorithms constituting the system should satisfy the following requirements:

1. Inertial Sensors

Major changes are currently underway in technologies associated with inertial sensors used for stabilization, control, and navigation. These changes are enabling the proliferation of inertial sensors into a wide variety of new military and commercial applications. Main Challenges for design and fabrication of inertial sensors are low cost, high reliability, accuracy required by mission, small size, and lightweight.

(1) Fiber-Optic Gyros (FOG)
   An economical replacement for the ring laser gyro (RLG) providing the same level of gyro bias performance.

(2) Silicon Micromechnical Gyros
   Continuous reduction in the gyro drift rate for more demanding applications.

(3) Resonating Beam Accelerometers (4) Silicon Micromechanical Accelerometers

2. GPS Receiver

As regards GPS sensor size, the current GPS receiving card (OEM, original equipment manufacture) is less than the size of a cigarette box. Technical trades for design of GPS receivers for GPS guided vehicle will focus on enhancement of high anti-jamming and high dynamic performance, and decrease of GPS measurement noise, including multipath effects.

(1) Trade-off between tracking loop bandwidth and high anti-interference of GPS receiver.

(2) Short time-to-first-fix (TTFF) and signal reacquisition time.

(3) Direct rapid P-code tracking and capturing.

(4) Inertial aiding code and carrier tracking loops.

(5) Receiver hardware/software digital signal processing.

(6) Anti-multipath antenna design.

3. Integrated System Algorithms

In future GPS/IMU integrated navigation systems, the fully-coupled integration requires that the GPS measurements and inertial sensor information are directly fused into a centralized navigation Kalman filter, and outputs of the filter can also aid the receiver tracking loops to improve the anti-jamming capability of the GPS receiver. Therefore, the technical challenges will be the following:

(1) System reconfiguration based on multiple sensors.
(2) Multi-mode robust navigation Kalman filter.
(3) Sensor failure detection and isolation.
(4) Inertial aiding on-the-fly phase ambiguity resolution and cycle slip detection.
(5) Rapid transfer alignment.

The current technical innovation will contribute significantly to the prospects for high dynamic vehicle proliferation. Historically, the most significant obstacles to the design and development of high dynamic guided vehicle have been the cost and complexity of vehicle guidance systems.

SUMMARY OF THE PRESENT INVENTION

The main objective of the present invention is to provide a positioning process and system thereof, which is an innovative fully-coupled GPS/INS algorithm for enhancing the performance of GPS/INS integration navigation system in heavy jamming and high dynamic environments, that utilizes the GPS carrier phase information to determine highly Time Space Position Velocity Information (TSPVI).

Another objective of the present invention is to provide a positioning process and system thereof, in which an advanced fully-coupled GPS/INS integrated system architecture is developed, which makes possible the implementation of mutual error compensation and aiding between GPS and IMU from the view of hardware and software implementation. The architecture provides the most cost-efficient approach for the implementation of hardware/software systems and the aiding of GPS with INS data.

Another objective of the present invention is to provide a positioning process and system thereof, in which a novel V-A (velocity-acceleration) aiding GPS signal tracking loop algorithms including code tracking loop algorithm and carrier tracking loop algorithm have been completed. Under the new architecture of GPS/INS integration, both the GPS receiver's code and carrier tracking loop can be aided by INS data at a high rate of data, which dramatically increase the measurement accuracy, dynamic tracking capability, and anti-jamming capability of GPS receiver.

Another objective of the present invention is to provide a positioning process and system thereof, in which an innovative IMU aiding widelane carrier phase ambiguity resolution on-the-fly algorithm is developed, which can provide highly and precise carrier phase measurements for the integrated navigation Kalman filter. The approach significantly reduces the time spent for an ambiguity search procedure and increases the resolution of ambiguity.

Another objective of the present invention is to provide a positioning process and system thereof, in which a robust integrated navigation Kalman filter is implemented in real time. The filter more effectively utilizes all available measurements and a prior information, including GPS pseudorange, delta range, carrier phases measurements, inertial measurement information, to determine and correct for system errors in a fully-coupled fashion.

Another objective of present invention is to provide a positioning process and system thereof, in which a novel algorithm for rapid transfer alignment and calibration for both aircraft INS and munition INS attitude is studied. This algorithm is used to remove initial position, velocity and attitude errors of tactical munitions.

Another objective of present invention is to provide a positioning process and system thereof, in which a real-time kinematic GPS/IMU integrated navigation software system is implemented, which also provide a tool for development of different levels of GPS/IMU integrated navigation systems adaptable to wide usage applications.

Another objective of present invention is to provide a positioning process and system thereof, in which a navigation computer system is designed, that directly points to a broad class of military/civilian/government applications including strike weapons, unmanned airborne vehicle and avionics platforms.

Another objective of present invention is to provide a positioning process and system thereof, which not only provides a solid basis and powerful tools for the improvement of accuracy of the navigation systems used for the guided vehicle, but also creates a new trend and open new directions for further investigation of challenging problems faced by designs of advanced navigation systems for high dynamic vehicle.

Accordingly, in order to achieve the above objectives, the following innovative technical features have to bring to our investigation.

1. Optimal Integrated Mode: Position and velocity (P-V) integrated method, pseudorange and delta range ($\rho/\Delta v + \Delta\theta$) integrated mode without IMU aiding the GPS tracking loops, kinematic integration mode $\rho+\phi/\Delta v+\Delta\theta$ without IMU aiding the GPS tracking loops, ($\rho/\Delta v+\Delta\theta$) integrated mode with IMU aiding the GPS tracking loops and $\rho+\phi/\Delta v+\Delta\theta$ with IMU aiding the GPS tracking loops. The comparison of the existing different integration approaches led to the option of the optimal integration architecture for the fully-coupled kinematic GPS/IMU integrated navigation system.

2. Innovative technique for inertial aiding of the GPS tracking loops: One of the technology trends towards GPS/IMU integrated systems is to develop a fully-coupled kinematic GPS/IMU integrated system, where the GPS receiving set's code and carrier tracking loops are aided with inertial sensor information. We have tried to make use of the most updated results in our IMU aiding GPS tracking loops algorithm to improve GPS measurement accuracy and anti-jamming capability in a tactical dynamic environment.

3. Novel inertial information aiding phase ambiguity resolution technique: High dynamic kinematic GPS navigation is limited by the ability to resolve the carrier integer cycle ambiguity in a timely manner. An IMU aiding widelane ambiguity resolution technique is utilized to significantly reduce the time for the ambiguity search procedure and to obtain highly reliable ambiguity solutions in a high dynamic environment. The method can also be used for the resolution of carrier integer cycle ambiguity in the single-frequency kinematic GPS measurements.

4. Robust centralized integrated Kalman filter: A complete approach to reliable, robust, and adaptable Kalman filter is developed which can operate in more than one dynamic environment to predict the actual system performance. This type of filter configuration has many advantages over the usual Kalman filter such as a larger region of convergence, smoother transitions between over-determined solutions and more conservative modeling when certain states are frozen, such as during clock or altitude hold. In addition, the centralized filter approach to kinematic GPS/IMU integrated algorithm avoids filter instability problems as the filter-driving-filter configuration meets.

5. Rapid transfer alignment.

Furthermore, a highly challenging research topic in the development of a new generation integrated guidance navigation systems using low-cost IMU sensors is to develop a fully-coupled kinematic GPS/IMU navigation system adaptable to a high dynamic flight environment. The term fully-coupled means that the IMU and GPS directly complement each other. The IMU-derived velocity and acceleration (V-A) information can be used to aid a GPS receiver's code and carrier phase locked-loops for tracking the Doppler-drifted satellite signals. And vice-versa, the long-term stability and accuracy of the GPS position and velocity information can be utilized to compensate and calibrate the bias and drift errors of the IMU sensor. Several possible levels of hardware and software integration methods have currently been presented for the various purposes of GPS/IMU integration. According to the traditional category method, the architecture of the integration system is classified into two types: loosely-coupled and tightly-coupled systems. Generally speaking, the loosely-coupled system has an unambiguous definition and requirements for GPS and INS. For example, the loosely-coupled system needs the independent navigation solutions from GPS and INS systems, respectively. But, the tightly-coupled system is easily confused from the view of availability of the GPS and IMU measurement information. For example, fusion of either pseudorange or carrier phase measurements into the integrated Kalman filter leads to different requirements for the GPS receiver and different integrated algorithms for data processing. The information flow between the IMU and the GPS receiver depends on levels of the GPS/IMU integration. Therefore, we classify the integrated GPS/IMU system into 5 types of integration modes from the view of information fusion.

A. GPS/INS P-V integration mode: Traditionally, it is also called the loosely-coupled mechanization. In the integrated system, the GPS and INS are considered as independent navigation systems, as shown in FIG. 1.

The integrated navigation solutions are provided by a separately integrated navigation Kalman filter, which directly utilizes the navigation solutions (position and velocity or time and attitude) derived by the GPS and INS navigation systems, respectively. The GPS P-V solution can correct the INS solution errors periodically. Theoretically, the IMU-derived V-A solution can aid the GPS receiver tracking loops if the GPS receiver hardware/software systems are properly designed. But, it is practically difficult because the loosely-coupled mechanization has a cascaded filter performance with which the integrated navigation Kalman filter can not provide the GPS tracking loops with a high rate data input. The GPS/INS P-V integrated navigation systems can be found in military GPS applications in the past decades. One disadvantage of the GPS/INS P-V integration system is that cascaded filter performance can be degraded by correlations in the data. Care must be taken to ensure that the time-correlated outputs of the GPS filter do not cause stability problems in the integrated navigation filter. Another disadvantage of the loosely coupled architecture is that the GPS filter can experience large errors in the presence of high receiver dynamics; this may necessitate aiding from the integrated navigation filter, which can worsen the correlation problem. But, an obvious advantage of the loosely coupled technique is that it allows maximum use of off-the-self hardware and software that can be easily assembled into a cascaded system without major new development.

B. GPS/IMU $\rho/\Delta v+\Delta\theta$ Integration Mode without Aiding of GPS Tracking Loops: In the GPS/IMU $\rho/\Delta v+\Delta\theta$ integration mode, the integrated navigation Kalman filter directly fuses and processes the raw measurement data from the GPS and IMU sensors, respectively, such as GPS pseudorange (PR) and delta-range (DR) measurements, and inertial indications of IMU acceleration and angular rate. Therefore, the centralized navigation filter gives the unique navigation solutions. FIG. 2 describes the architecture of the integration mode.

The integration mode can dramatically improve the accuracy of the integrated navigation system better than as the loosely-coupled mode does. But, the integration mode can not enhance the dynamics of GPS tracking loops and increase anti-interference capability of the GPS receiving set because of lack of the inertial aiding information available to the GPS receiver tracking loops. Its main advantage is that almost all GPS receivers in the market can be conveniently integrated with IMU sensors into a GPS/IMU integrated navigation system, and there are no special requirements for GPS receivers.

C. GPS/IMU $\rho/\Delta v+\Delta\theta$ Integration Mode with Aiding of GPS Tracking Loops: Traditionally, this integration mechanization is called the tightly-coupled architecture. The obvious distinctions between the above mode in B and this mode are the levels of information fusion and requirements for the GPS receiver. This mode requires that the GPS receiving set must accept the aiding information from the integrated navigation Kalman filter for the GPS receiver code tracking loop aiding. And the Kalman filter must output velocity and acceleration (V-A) information at a high data rate in order to allow the aiding information to be available in the GPS receiver. FIG. 3 shows the architecture of this integration mode.

The integration architecture more effectively utilizes GPS and IMU measurements and a priori information to determine and correct for system errors in a highly integrated fashion. It also yields better performance than the above two systems, providing more accurate navigation estimates during periods of a high dynamic flight or jamming environment. In the integration mode, the design of a tracking loop mechanism for GPS sensors imposes the requirements on both the hardware and the software algorithms for reception and processing of the velocity and acceleration (V-A) aiding information from the navigation filter. Its main advantages are the enhancement of anti-jamming capability and improvement of adaptability for high dynamic environments of the GPS receiving set. From the view of the system design, the integrated navigation system design faces more challenges in GPS receiver digital signal processing, tracking loop aiding, data exchange and system integration.

D. GPS/IMU $\rho+\phi/\Delta v+\Delta\theta$ Integration Mode without Aiding of GPS Tracking Loops: The integration mode is similar with the architecture in the above mode B. The difference, however, is only in the type of information fusion as shown in FIG. 4. In the integration mode, the kinematic GPS technique is utilized in order to obtain more accurate GPS measurement data.

The GPS carrier phase measurement can obtain the sub-centimeter measurement accuracy. But, the phase integer cycle ambiguity and cycle slip problems in the carrier phase observable limit the obtainment of highly accurate positioning solutions, especially or on-the-fly phase ambiguity resolution and cycle slip detection in a high dynamic environment. Once the phase ambiguity and cycle slip problems are solved, the integrated system can achieve better positioning accuracy than the above other systems can do. In addition, the integrated system has no special requirements for the GPS receiver except for the carrier phase measurement.

Main disadvantage is that the integrated mode can not improve the original dynamic performance of the GPS receiver.

E. GPS/IMU $\rho+\phi/\Delta v+\Delta\theta$ Integration Mode with Aiding of GPS Tracking Loops: We call this integration mode the fully-coupled integration mode. In the fully-coupled $\rho+\phi/\Delta v+\Delta\theta$ integration mode, all available GPS measurements are integrated into a centralized navigation Kalman filter with the IMU measurements. The integrated velocity and acceleration information is also used to aid the GPS receiver's code and carrier phase tracking loops in order to improve the anti-interference capability and dynamics of the GPS receiving set in a tactical high dynamic flight environment. It is now a challenging problem to develop the kinematic GPS/IMU integrated navigation system with the above integration features.

This integration mode is the primary challenge in the research and development of various integrated navigation systems. The accuracy, reliability, dynamic performance and anti-jamming capability of the integrated navigation system are dramatically enhanced through use of the integration mechanism.

In the past years, some kinematic integration methods used in GPS/IMU navigation systems are effective under a low dynamic environment or limited flight environment, for example, in marine navigation and aerial photographic aircraft. However, many kinematic GPS/INS integration systems with the architecture in D only consider how phase ambiguity and carrier cycle slips are resolved and detected. But they do not further consider how IMU velocity and acceleration information can be utilized for aiding the GPS receiver tracking loops (Delay-Locked Loop or code loop/ DLL and Phase-Locked Loop/PLL). Unfortunately, such integration methods do not improve the dynamic tracking capability of the GPS receivers although they increase the accuracy of the integrated navigation system and provide IMU instrument errors compensation during the period of GPS receiver operation. In such integration technique, the IMU only provides the estimated position and velocity for the GPS receiver to reduce the phase ambiguity search space, and ranging errors corrections in order to increase the navigation accuracy. Once the GPS receiver loses its lock-onto satellite signals, there is no further link between the GPS receiving set and the IMU sensors.

Each one of the above integration modes has its advantages in the corresponding performance/cost and synergy efficiency tradeoffs, flexibility and simplification of the realization and redundant navigation solutions. But, available observables used in the current integration methods are mainly code pseudorange and range rate in addition to general acceleration and angular rate outputs of IMU sensors. The velocity information derived by IMU sensors is mainly utilized to aid the frequency lock-on of the carrier-frequency tracking loop (Doppler removal before codes matching) for the purpose of code delay measurement but not that of carrier phase measurement. Therefore, the range measurement accuracy is still limited by code tracking loop bandwidth and resolution. Especially, in order to acquire the GPS satellite signals in the high dynamic environment, the bandwidth of the closed loop of the unaided carrier-phase tracking loop in the GPS receiver must be wide enough to adapt to the fast GPS signal frequency and phase changes caused by high dynamic motion. It is fairly difficult to achieve without external aiding tracking information because there exists unwanted interference noise which will simultaneously enter the tracking loop with a wider closed-loop bandwidth.

Moreover, a fully-coupled kinematic GPS/IMU algorithm (FCKGA) navigation software package is incorporated the present invention which efficiently utilizes the developed results in this invention, such as robust centralized Kalman filter, IMU-aided on-the-fly widelane ambiguity resolution and IMU V-A aiding tracking loops.

The successful development of the FCKGA navigation software system will give e a competitive edge with sophisticated navigation and guidance systems. This advanced system is featured with the following important advantages:

(1) Hardware-Level Redundancy: In the fully-coupled integration mode, the GPS receiving set is used as one of the sensors (GPS, gyro and accelerometer) of the integrated navigation system. The restriction of at least 4 satellites for navigation solution computation can be significantly relaxed. The hardware-level redundancy will help to enhance the reliability of the overall system through fault-tolerant software design.

(2) Use of Low-Cost IMU Sensors: In the FCKGA-based system, precise positioning results can be used to routinely correct IMU instrument errors in flight. Therefore, low-cost non-INS-grade inertial sensors can be utilized in the integrated navigation system.

(3) Minimum of Tracking Loop Bandwidth and High Anti-Interference: In the fully-coupled integration mode, the V-A solution of the integration navigation filter is transferred as V-A information along the line-of-sight between the GPS satellites and the integrated system, and fed back to the digital signal processor of the GPS receiving set at a high rate. In the signal processor, the V-A information is used to compensate the high dynamics. Therefore, the fixed bandwidth of the tracking loop can be reduced to a minimum to prevent unwanted interference noise.

(4) Fast Phase Ambiguity Resolution/Cycle Slip Detection On-The-Fly: The precise positioning results of the integrated system can generate the computed range between satellites and the navigation system. The computed range is compared with the measured range between the satellites and the navigation system, and the resultant difference can be utilized to detect cycle slip and reduce the ambiguity search space efficiently.

(5) High Navigation Accuracy: The integrated navigation system uses the kinematic GPS technique with centimeter-level measurement accuracy to significantly improve the navigation accuracy of the integrated system. Once atmospheric delays and selective availability (using dual-frequency and an authorized GPS receiving set), phase ambiguity and cycle slip problems (using methods developed in this invention) are solved, the navigation accuracy of the integrated system only depends on the IMU instrument errors. The integrated navigation system is designed to perform IMU dynamic correction and alignment. Furthermore, the integrated navigation output is at the rate of the INS output.

DETAILED DESCRIPTION OF THE PREFERRED EMBODIMENT

The present invention provides a process and system for fully-coupled positioning of a vehicle on the air, land, and space, using the measurements from a global positioning system and an inertial measurement unit to improve navigation performance.

Figure 1:
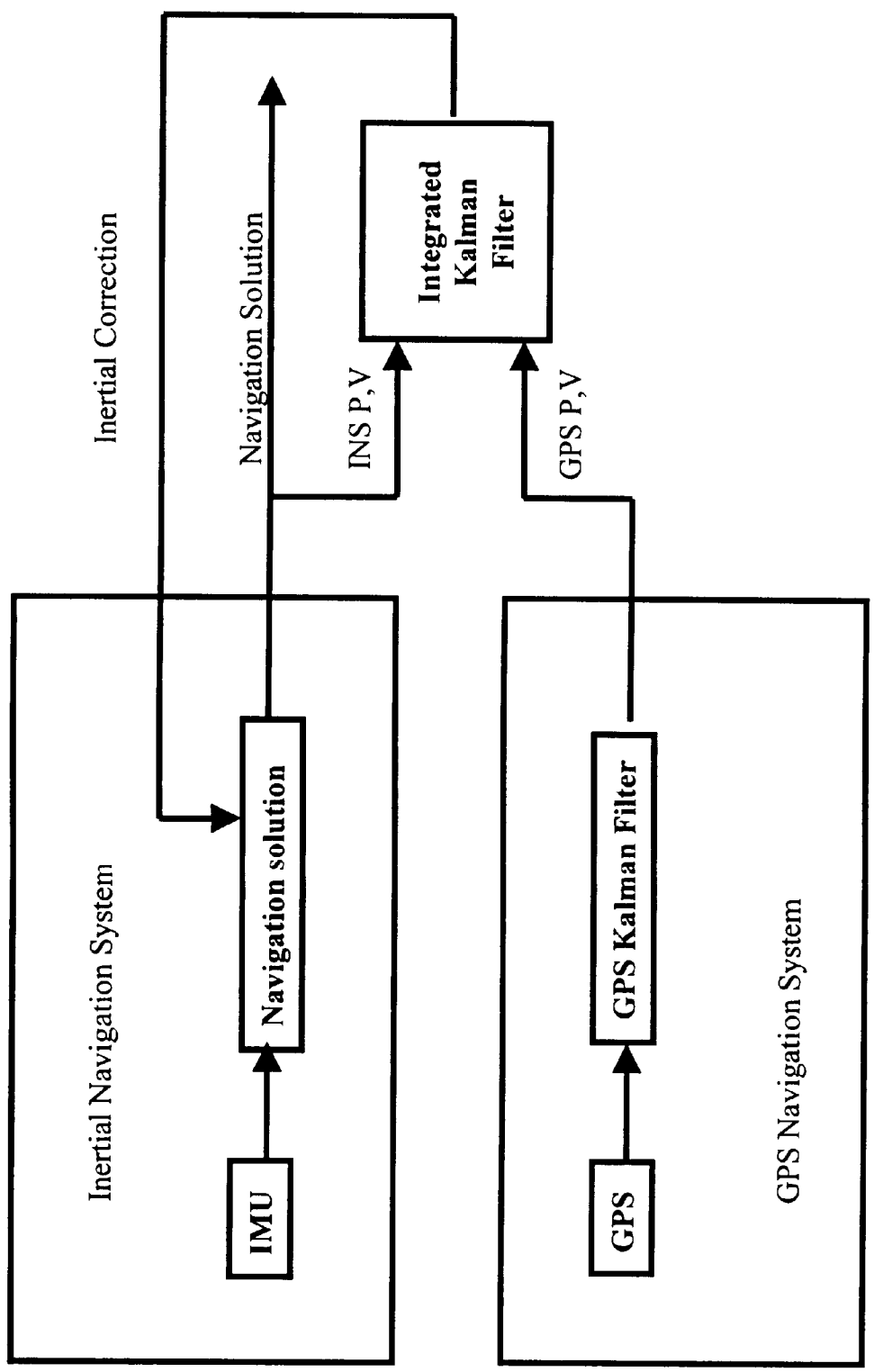
FIG. 1 is a block diagram illustrating the architecture of GPS/INS P-V integration mode.
Figure 2:
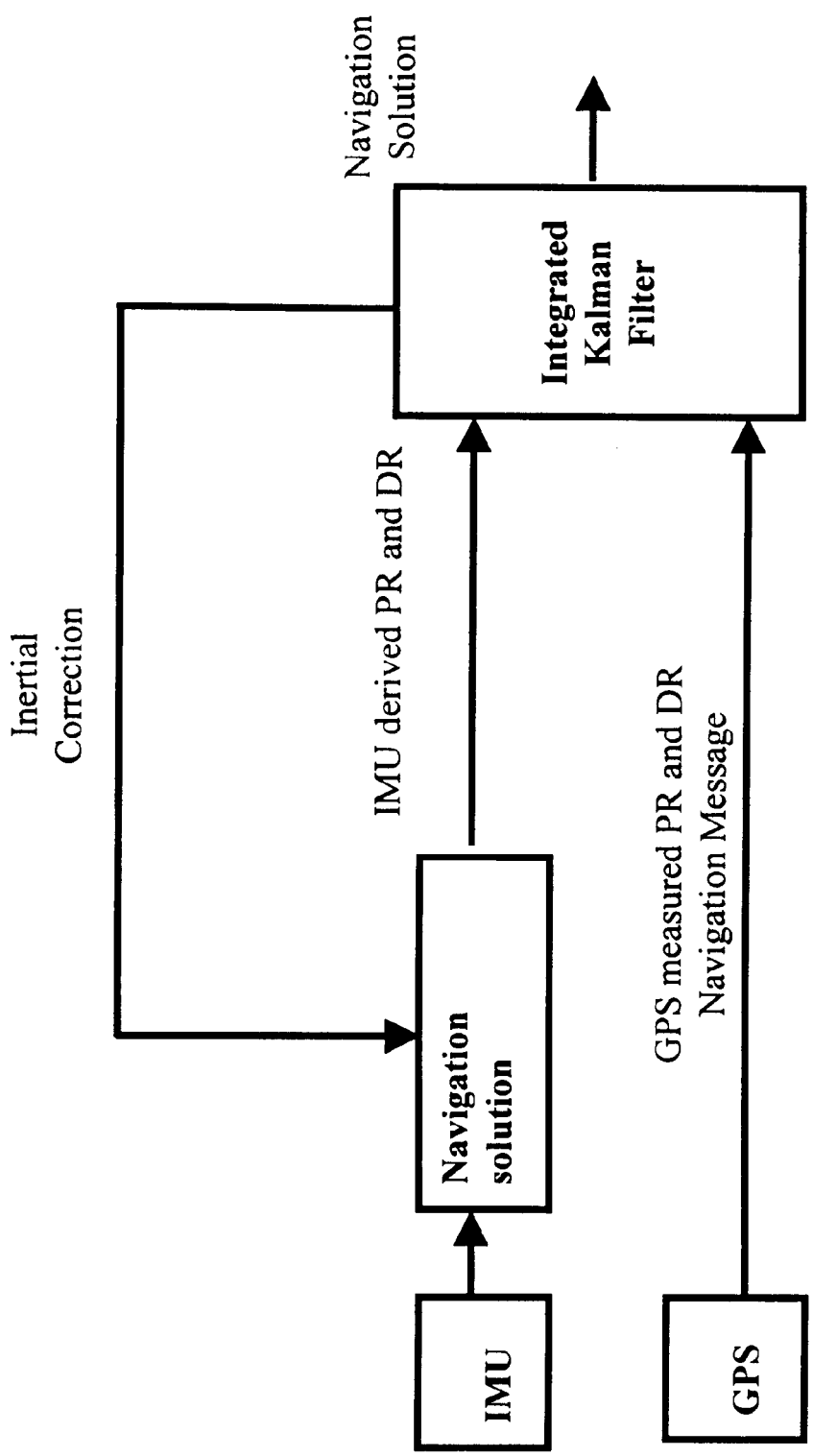
FIG. 2 a block diagram illustrating the architecture of GPS/IMU $\rho/\Delta v+\Delta\theta$ Integration Mode without Aiding of GPS Tracking Loops.
Figure 3:
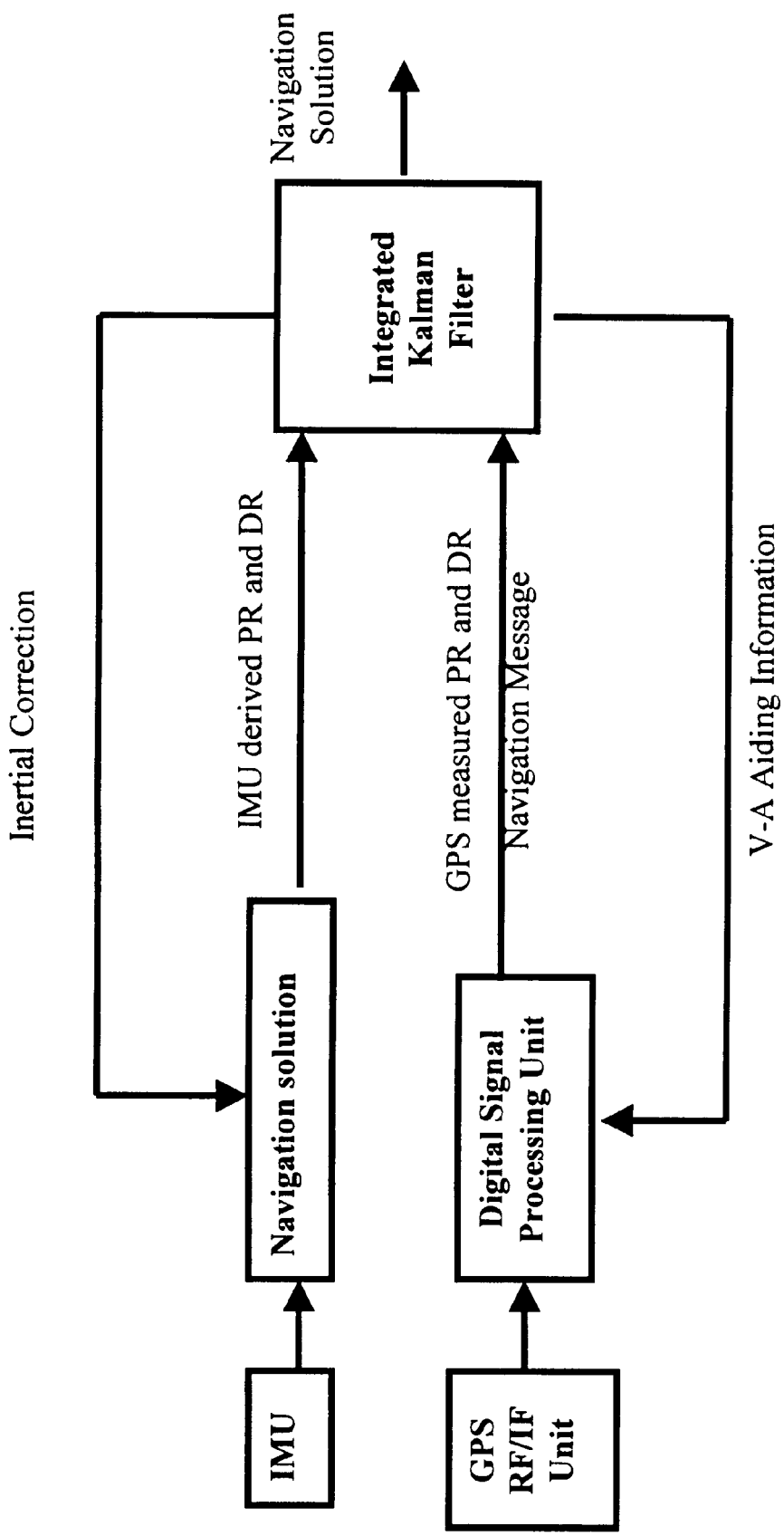
FIG. 3 is a block diagram illustrating the architecture of GPS/IMU $\rho/\Delta v+\Delta\theta$ Integration Mode with Aiding of GPS Tracking Loops.
Figure 4:
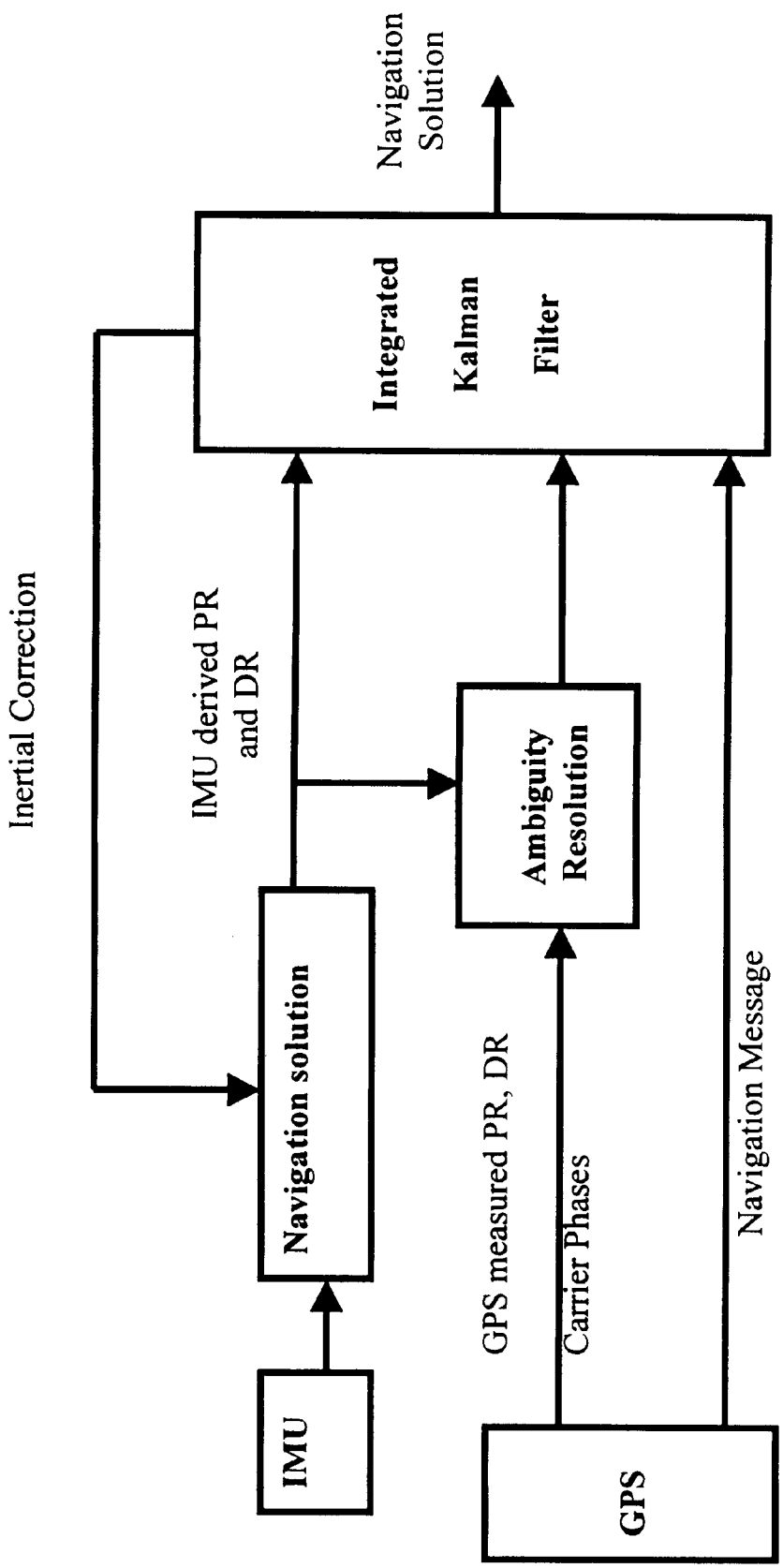
FIG. 4 is a block diagram illustrating the architecture of GPS/IMU $\rho+\phi/\Delta v+\Delta\theta$ Integration Mode without Aiding of GPS Tracking Loops.
Figure 5:
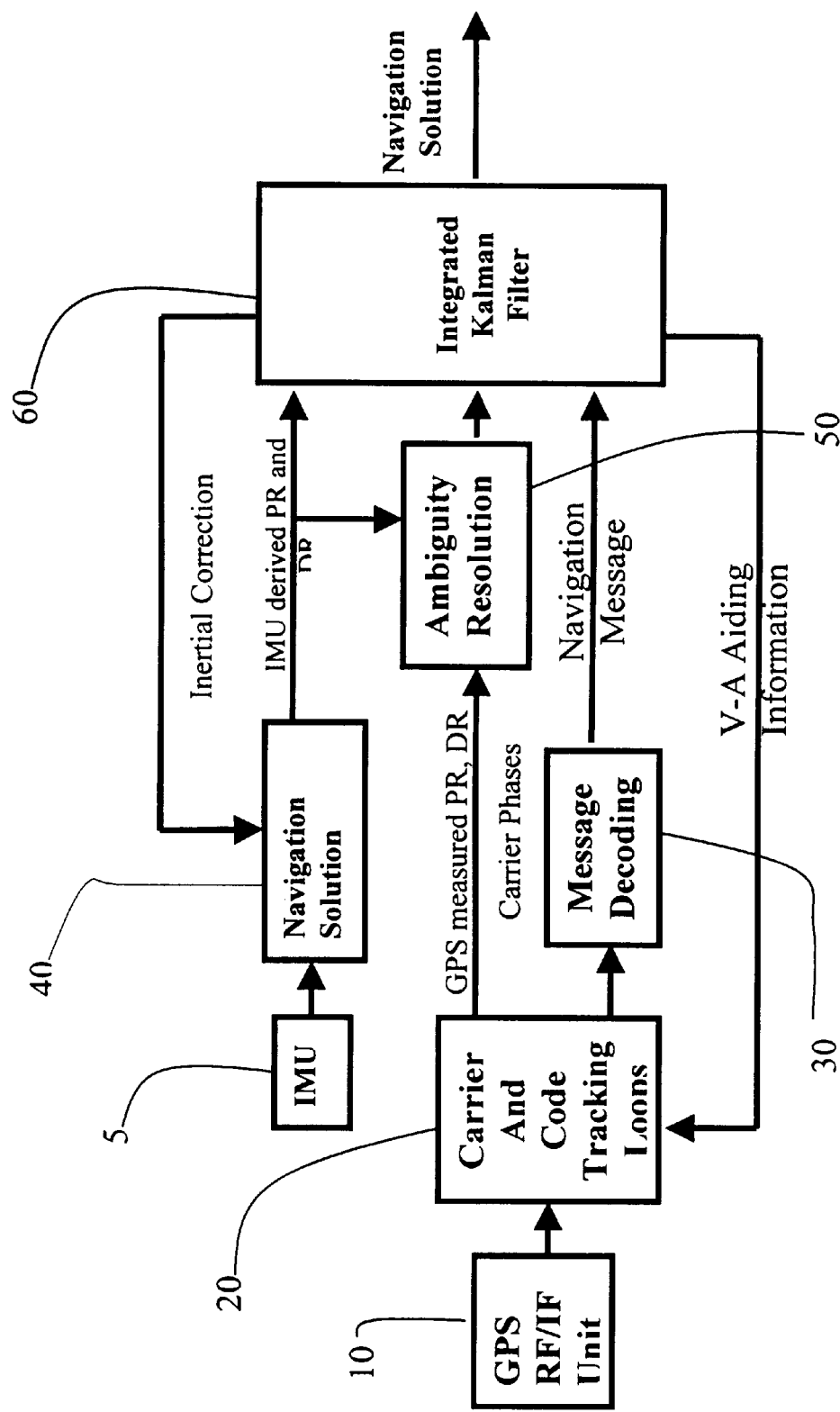
FIG. 5 is a block diagram illustrating the architecture of GPS/IMU ρ+φ/Δν+Δθ Integration Mode with Aiding of GPS Tracking Loops.

Referring to FIG. 5, the positioning process of the present invention comprises the steps as follows:

1. Accept an angular rate and acceleration measurements of a vehicle from an inertial measurement unit or position, velocity, and attitude measurements of other external sensors and compute an initial value for IMU navigation equations;
2. Receive GPS radio frequency signals and derive GPS pseudorange, delta range, and carrier phase measurements;
3. Receive the angular rate and acceleration information from the inertial measurement unit and solve the inertial navigation equations to obtain an inertial navigation solution, such as position, velocity, and attitude.
4. Combine the GPS pseudorange, the delta range, and the carrier phase measurements and the inertial navigation solution for obtaining a fully-coupled positioning solution.

To obtain better performance, in step 2, the GPS signal is tracked by a carrier phase locked loop and a code tracking loop of the GPS receiver, and the process of the phase locked loop and code tracking loop of the GPS receiver can be aided by the obtained fully-coupled positioning solution from the step 4.

To obtain better performance, in step 3, the errors of the inertial navigation solution can be removed with the optimal estimates of errors of the inertial navigation solution from the step 4.

To obtain better performance, the step 2 further comprises a step 2A of performing carrier phase integer ambiguity resolution and cycle slip detection processing to incorporate the high accurate GPS carrier phase measurements to the combination of the step 4.

To obtain better performance, the step 2 further comprises a step 2B, which aids processing of carrier phase integer ambiguity resolution and cycle slip detection with fully-coupled positioning solution from the step 4.

To obtain better performance, the step 4 can be implemented by a Kalman filter.

To obtain better performance, the step 4 can be implemented by a multi-mode Kalman filter.

To obtain better performance, the step 4 can be implemented by a robust Kalman filter.

The body angular rate and acceleration measurements from the IMU 5 are processed in the navigation solution 40, and are passed to the integrated Kalman filter 60. The error estimates provided by the integrated Kalman filter 60 are fed back to the navigation solution 40 to remove the errors of the position, velocity and inertial sensors. The GPS signals received by a GPS antenna are processed in the GPS RF/IF Unit 10, the carrier and code tracking loops 20, the ambiguity resolution 50 and the message decoding 30, and are passed to the integrated Kalman filter 60. The optimal velocity and acceleration information of the integrated Kalman filter 60 are fed back to the carrier and code tracking loops to aid GPS signal tracking process. The position, velocity, attitude from the navigation solution 40 is input to the ambiguity resolution 50 to aid the GPS carrier phase integer ambiguity resolution.

In step 1, the initial position, velocity, and attitude information need be provided to the navigation equations of the navigation solution 40 during initializing process of EMU before the integrated kinematic GPS/IMU system is put to formal operation. The step 1 may have three methods to initialize an IMU:

1-1) Self-Initialization of IMU

This mode can be just used on the static ground. The signals input to the step 1-1 process is the gravity, Earth rate signal, latitude, and longitude. The gravity signal the accelerator of the IMU 5 senses is used to determinate local level plane. The Earth rate signal the gyro of the IMU 5 senses is used to determinate azimuth. The step 1-1 process output the position, velocity, attitude, and estimated inertial sensor error to the navigation equation of the navigation solution 40.

1-2) Transfer Alignment

If the IMU is a tactical munition IMU installed in a launch platform, the step 1-2 processes the measurement or navigation parameter of the tactical munition IMU and the launch platform IMU to align the tactical munition IMU. The measurement or navigation parameter of the tactical munition IMU and the launch platform IMU are input to a transfer alignment process. In the transfer alignment process, a transfer alignment filter processes the measurement or the navigation parameter to provide the optimal initialization information to the tactical munition IMU.

1-3) GPS In-Flight Alignment

If a global position system receiver is selected as the external sensor, the GPS position and velocity, an inaccurate initial attitude value are used first as an initial value of the navigation equations of the inertial measurement unit, and accurate alignment of the inertial measurement unit is further performed using GPS signals.

Referring to FIG. 5, the step 2 further comprises the following steps:

Step 2-1

The received GPS signals are input to the GPS RF/IF unit 10. In the GPS RF/IF unit 10, the GPS RF (radio frequency) signals are amplified and down converted to IF (Intermediate Frequency). The GPS IF signals are amplified, low-pass filtered, and transformed onto GPS baseband signals. The analog GPS baseband signals are sampled in an Analog-to-Digital (A/D) converter. The digital GPS signals are passed to the carrier and tracking loops 20.

Step 2-2

The digital GPS signals from the GPS RF/IF unit 10 and the V-A (velocity -accelerate) aiding information from the Integrated Kalman filter 60 are input to the carrier and code tracking loops 20, which comprises a carrier phase locked loop and an early-late digital delay lock loop (DDLL) for a tracking GPS satellite signals.

GPS pseudorange, delta range, and carrier phase measurements are output by the carrier and code tracking loops 20 to the ambiguity resolution 50. The recovered carrier and code and GPS signal are output by the carrier and code tracking loops 20 to the message decoding 30.

Figure 6:
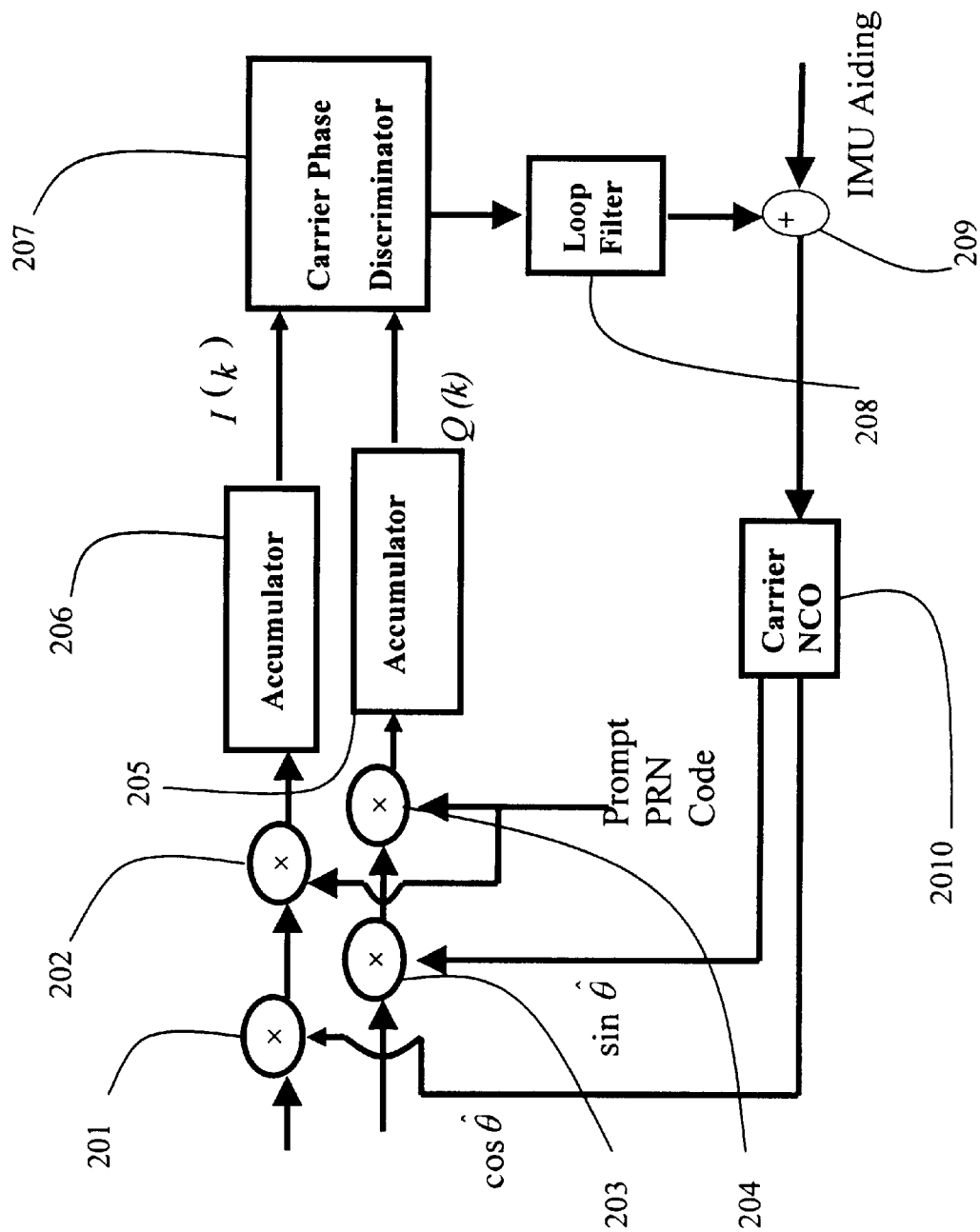
FIG. 6 is a block diagram illustrating the DPLL with the INS aiding.

Referring to FIG. 5 and FIG. 6, the i-th sample of the received GPS signal (for example, L1 C/A code) downconverted into the baseband from the GPS RF/IF unit 10 is $$s(i)=\sqrt{2P}CA[(1+\zeta)iT_s-\xi T_c]\cos[(\omega_b+\omega_d)i+\phi_0]+n(i)$$

Where

P is the received signal power.

CA[·] is a ±1-valued PRN code with rate R, and is delayed by $\tau=\xi T_c$ with respect to the GPS signal transmitting time ($T_c$ is the code chip width).

$\omega_b(=2\pi f_b T_s)$, $\omega_d(=2\pi f_d T_s)$ are the sampled signal angular frequencies corresponding to the baseband carrier frequency $f_b$ and Doppler shift $f_d$ ($T_s$ is the sampling period).

$\phi_0$ is the initial value of the signal carrier phase at i=0.

n(i) is the equivalent input Gaussian band-limited noise at the baseband.

The code rate R is equal to $(1+\zeta)R_0$, where $\zeta=f_d/f_c$ ($f_c$ is the carrier frequency) corresponding to the code Doppler shift of $(f_d/f_c)R_0$, and $R_0$ is the code rate without the Doppler shift.

The GPS digital signal from the GPS RF/IF unit 10 are multiplied with the local in-phase cos $\hat{\theta}$ and quadrature sin $\hat{\theta}$ reference signals from the carrier NCO 2010 at the mixer 201 and mixer 203, respectively. The outputs of the mixer 201 and mixer 203 are multiplied by the prompt PRN (pseudo random noise) code from the code generator 2017 of the code tracking loop at the mixer 202 and mixer 204, respectively, in order to remove the input PRN code modulated on the carrier frequency that is called despreading operation. After the pseudo random noise code is removed, the GPS signal SNR (signal-noise ratio) is increased by the despreading gain provided by the despreading operation. The output of the mixer 202 is passed to the accumulator 206 to be accumulated. The output of the mixer 204 is passed to the accumulator 205 to be accumulated. The in-phase signal output by the accumulator 206 is $$I(k)=\sqrt{P/2}R(\tau-\hat{\tau})\text{sin }c[(\Delta\omega_d)_k N/2]\cos[\theta(k)-\hat{\theta}(k)]+n_I(k)$$

which is output to the carrier phase discriminator 207. The quadrature signal output by the accumulator 205

$$Q(k)=\sqrt{P/2}R(\tau-\hat{\tau})\text{sin }c[(\Delta\omega_d)_k N/2]\sin[\theta(k)-\hat{\theta}(k)]+n_Q(k)$$

to the carrier phase discriminator 207.

Where, $(\Delta\omega_d)_k=\omega_{dk}-\hat{\omega}_{dk}$ is the Doppler shift estimation error in the k-th interval.

$\theta(k)$, $\hat{\theta}(k)$ are the phases of the incoming signal and the local NCO signal at the center of the interval, respectively.

$n_I(k)$, $n_Q(k)$ are the lumped noise components of I(k) and Q(k), respectively.

The carrier phase discriminator 207 works on the outputs of the in-phase and quadrature correlators at a rate ($f_s/N$), where $f_s$ is the sampling rate and N is the number of data samples in each DDLL correlation interval.

The arctangent phase detection operation of the in-phase and quadrature signals in the carrier phase discriminator 207 results in the phase error, as follows $$e(k)=\arctan[Q(k)/I(k)]=g[\epsilon(k)]+n_\theta(k)$$

$$e(k)\in[-\pi,+\pi]$$

where g[·] is the characteristic function of the phase discriminator.

$\epsilon(k)=\theta(k)-\hat{\theta}(k)$ is the phase tracking error due to a noise-free incoming signal.

$n_\theta(k)\in(-\pi-g[\epsilon(k)],+\pi-g[\epsilon(k)])$ is the phase disturbance due to the input noise.

As a result, the characteristic curve of the carrier phase discriminator 207 is linear with a period $2\pi$, $$g[\epsilon(k)]=\epsilon(k)\text{mod}[-\pi,+\pi]$$

The phase tracking error is output by the carrier phase discriminator 207 to the loop filter 208. The loop filter 208 is a digital filter and generally is implemented in first-order, or $2^{nd}$-order, or $3^{rd}$-order. The noise of the phase tracking error is filtered by the loop filter 208 filters, and the filtered phase tracking error is output by the loop filter 208 filters to the adder 209.

The phase tracking error form the loop filter 208 is received by the adder 209 receives, and is added with the IMU aiding data from the integrated Kalman filter 60, and is input to the carrier NCO (numerically-controlled oscillator) 2010.

The local in-phase and quadrature reference signals at the sampling rate $f_s$ for GPS non-coherently correlating (in the carrier phase acquisition process) or coherently correlating (in the carrier fine tracking process) generated by the carrier NCO 2010 are adjusted using the input phase tracking error.

The local in-phase signal is output by the carrier NCO 2010 to the mixer 201 and quadrature reference signals is output by the carrier NCO 2010 to the mixer 203, and GPS delta rang and carrier phase measurements are output by the carrier NCO 2010 to the ambiguity resolution 50.

Figure 7:
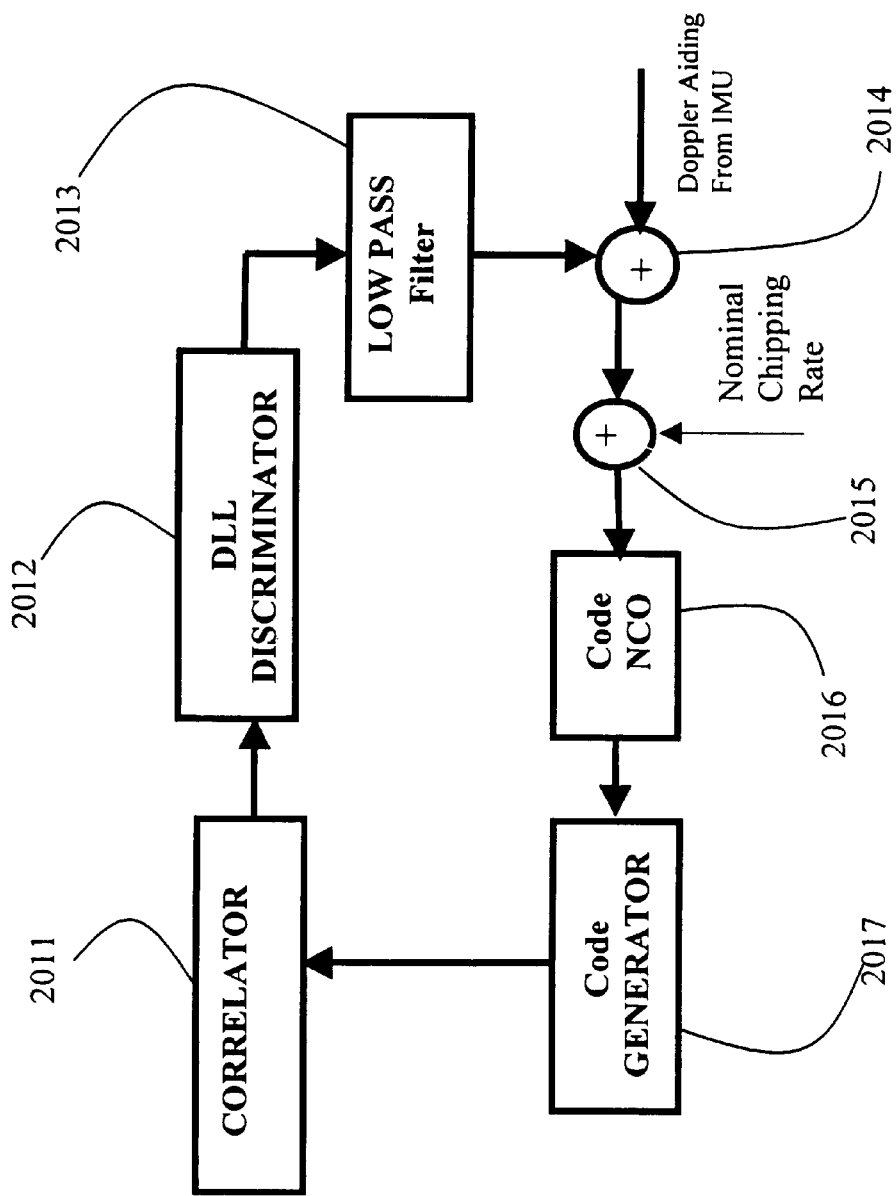
FIG. 7 is a block diagram illustrating the IMU aiding code tracking model.

Referring to FIG. 7, cooperated with the carrier phase locked loop, an early-late digital delay lock loop (DDLL) for a tracked GPS satellite, which is aided by IMU data, is used to perform two purposes:

(1) The code tracking loop provides an estimate of the magnitude of time shift required to maximize the correlation between the incoming signal and the receiver's internally generated 'on-time' code; this information of time delay is generally used by the receiver to calculate an initial user-to-satellite range estimate, known as the pseudorange (PR) measurement.

(2) The synchronized replica code signal derived from the tracking operation is applied to despread the GPS signal; this despread signal is then passed to the receiver's carrier tracking loop for demodulation of the data message, D(t), and for the carrier phase tracking process.

The typical GPS receiver uses the standard non-coherent delay-locked loop (NCDLL) as its code tracking loop. This loop is often called the 'early-late' delay-lock loop, referring to the advanced and delayed versions of the code replica driven by the voltage-controlled-oscillator. The coherent DLL is also used in some of the GPS receivers, which requires parallel carrier-phase tracking (and thus, the coherent qualifier). The most disadvantage inherent with the coherent DLL is that the code tracking loop will break lock when taking into account bit error or cycle slips. This is because the coherent DLL only works when phase tracking is successful. The coherent DLL only applies to those applications that also require successful phase tracking. Here only the process of the NCDLL with IMU aiding information is presented.

The outputs of the mixer 201 and the mixer 203 and the "Early" and "late" local codes from the code generator 2017 are received by the correlator 2011, and are put to the correlating computations. The results of the correlation in correlator 2011 are input to the DLL discriminator 2012.

The results of the correlation in the correlator 2011, which is the function of the code phase tracking error, accepted by the DLL discriminator 2012, and are used to extracts the code phase tracking error. The extracted code tracking estimation error from the DLL discriminator 2012 is input to the low pass filter 2013 to filter out the noise in the code phase tracking error.

The code phase tracking error, which is from the DLL discriminator 2012 and is corrupted by incoming noise, received by the low pass filter 2013, and are filtered. The filtered code phase tracking error is output to the adder 2017. The low pass filter 2013 is a digital filter and generally is implemented in first-order, or $2^{nd}$-order, or $3^{rd}$-order.

The code phase tracking error from the low pass filter 2013 is added by the adder 2014 with the Doppler aiding from IMU data through the integrated Kalman filter 60.

The output of the adder 2014 is added by the adder 2015 with the normal chipping rate, and is output to the code NCO 2016.

The PRN code generated by the code NCO 2016 is output to the code generator 2017.

The local "Early", "late", and prompt code generated by the code generator 2017 and are output to the correlator 2011. The GPS pseudorange measurements measured by the code generator 2017 are output to the ambiguity resolution 50.

After the processing of the carrier phase locked loops and the code late lock loops, the carrier and code of the received GPS signal are recovered. The received GPS baseband signal from the GPS/IF unit 10, the recovered code and carrier from the carrier and code tracking loops 20 are passed to the message decoding 30.

The GPS ephemeris from the received GPS baseband signal are demodulated by the message decoding 30 and are passed to the integrated Kalman filter 60.

Figure 8:
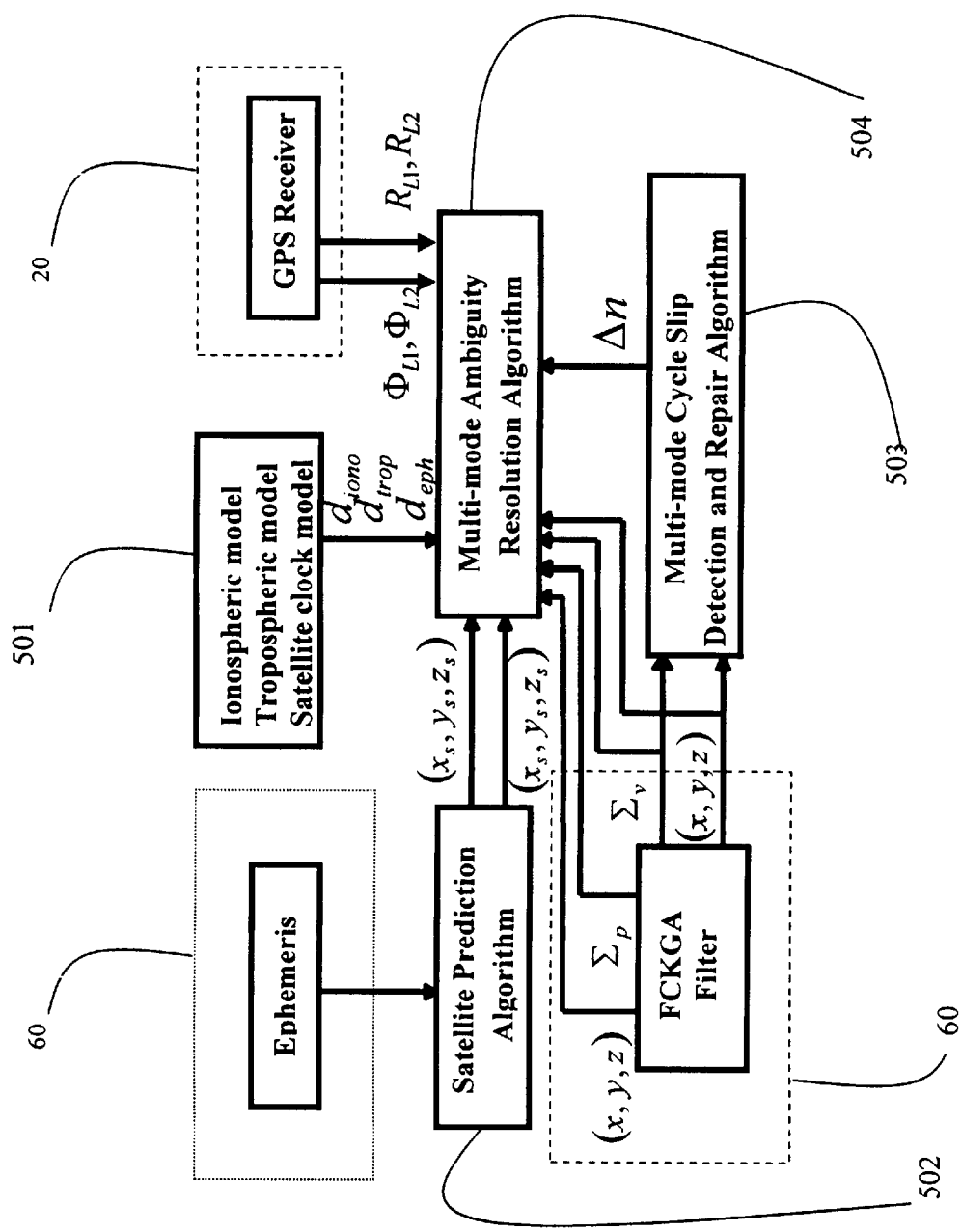
FIG. 8 is a block diagram illustrating the architecture of the IMU aiding on-the-fly phase ambiguity resolution.

Referring to FIG. 8, in step 2A and 2B, more accurate positioning with GPS is obtained by use of carrier phase measurement than by use of pseudorange measurements. This is because at the satellite L1 broadcast frequency, 1575.42 MHz, one cycle of the carrier is only 19 cm as compared to that of one cycle of the C/A code which is around 300 m. The high accuracy of positioning with GPS carrier phase measurement is based on the prior condition that the phase ambiguities have been resolved. The ambiguity inherent with phase measurements depends upon both the receiver and the satellite. Under the ideal assumptions of no carrier phase detection error and the known true locations of the receiver and satellite, the ambiguity can be resolved instantaneously through a simple math computation. However, there is the presence of satellite ephemeris error, satellite clock bias, atmospheric propagation delay, multi-path effect, receiver clock error and receiver noise in range measurements from GPS code tracking loop, we can only get a non-precise geometric distance from the receiver to the satellite which is called a code pseudorange.

The advantage of the IMU aiding phase ambiguity resolution and cycle slip detection is that the precision vehicle coordinates and velocity from the corrected INS solution are available to aid in determining the original ambiguities and the search volume. Additionally, the INS aiding signal tracking enhances the receiver's capability to hold the GPS signal, thus the probability of signal loss or cycle slip will be reduced.

The carrier frequency of GPS signals transmitted by GPS satellites may be divided into two carrier frequency L1 an L2, a GPS receiver can receive single frequency or dual frequency signal dependant on its design. The multi-mode ambiguity resolution algorithm 504 consists of the following modes:

(1) resolving ambiguities with single frequency phase data;
(2) resolving ambiguities with dual frequency phase data;
(3) resolving ambiguities by combining dual frequency carrier phase and code data, under the aiding of a GPS/IMU integrated filter.

When dual frequency is unavailable, the single frequency data and the geometrical distance derived from the data of the integrated Kalman filter 60 and the satellite prediction algorithm 502 are used to resolve the phase ambiguities. When dual frequency data is available, the wide lane technique is applied to extract the wide lane ambiguities. With the INS aiding, the wide lane ambiguities can be fixed quickly.

Referring to FIG. 8, the outputs of the inonospheric mode and troposheric mode and satellite clock model 501, the outputs of the satellite prediction algorithm 502, the outputs of the multi-mode cycle slip detection and repair algorithm 503, the output of the integrated Kalman filter 60, and the outputs of the carrier and code tracking loops 20 are received by the multi-mode ambiguity resolution 504 to resolve the carrier phase integer ambiguity.

After resolving the carrier phase integer ambiguity, GPS pseudorange, delta range, and carrier phase measurements are passed by the ambiguity resolution 50 to the integrated Kalman filter 60.

The GPS ephemeris from the message decoding 30 through the integrated Kalman filter 60 are received by the satellite prediction algorithm 502 and are used to compute the GPS satellite position and velocity, which are input to the multi-mode ambiguity resolution 504.

The effects of ionospheric and troposheric propagation of GPS signal and GPS satellite clock errors are modeled by the ionospheric model and troposheric model and satellite clock model 501. The delay of ionospheric and troposheric propagation of GPS signal and GPS satellite clock errors are computed by the ionospheric model and troposheric model and satellite clock model 501 and are input to the multi-mode ambiguity resolution 504.

The GPS receiver position and GPS satellite position from the integrated Kalman filter 60 are received by the multi-mode cycle slip detection and repair algorithm 504 receives, which includes the cycle slip detection algorithms and repair algorithms. The cycle slip detection algorithm is composed of a number of testing quantities. The first one is the measured carrier phase. This method often leads to a failure of cycle slip detection because phase is disturbed by many time dependent errors. The second method used for cycle slip detection is a dual-frequency phase combination. The phase/code combination is also used to determine the cycle slip in this multi-mode cycle slip detection algorithm. The last one is utilizing the velocity information from the integrated Kalman filter 60 to detect and repair the cycle slip. Once cycle slip occurring is detected by the multi-mode cycle slip detection algorithm 504, the location of the carrier phase jump and the size of cycle slip are determined. The repairs are made though correcting all subsequent phase observations for this satellite and this carrier phase by a fix amount. The repaired carrier phase is output by the multi-mode cycle slip detection and repair algorithm 503 to the multi-mode ambiguity resolution 504 after the location of the carrier phase jump and the size of cycle slip are determined and repaired.

The GPS receiver position and velocity and the covariance of the position error and velocity error from the integrated Kalman filter 60 are input to the multi-mode ambiguity resolution 504 and the multi-mode cycle slip detection and repair algorithm 503, in order to extract the geometrical distance between the satellite and the GPS receiver and to determine the ambiguities search volume.

The GPS pseudorang, delta range, carrier phase measurements from the carrier and code tracking loops 20 are input to the multi-mode ambiguity resolution algorithm 504.

Figure 9:
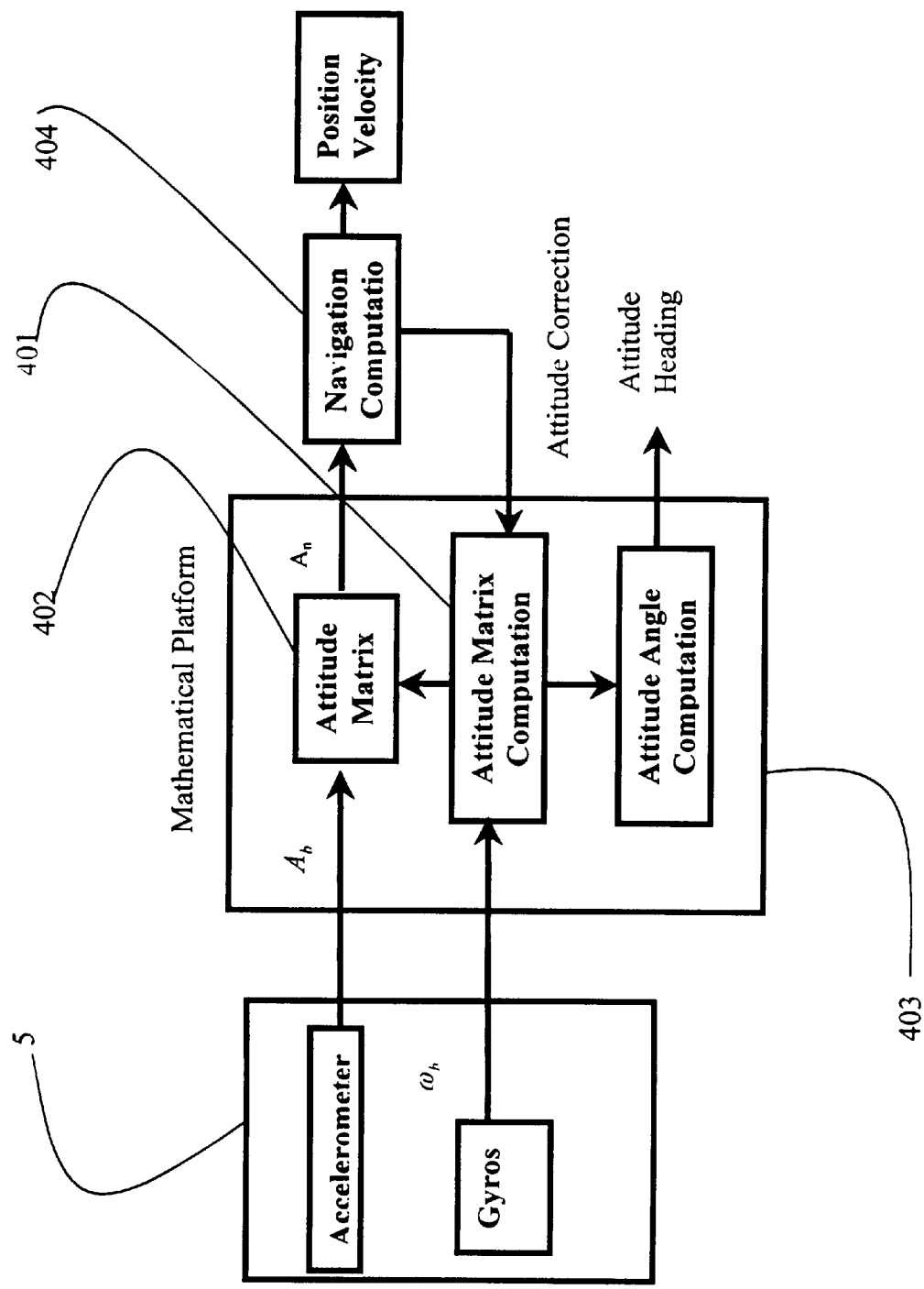
FIG. 9 is a block diagram illustrating the inertial navigation solution processing.

Referring to FIG. 9, in step 3, the body angular rates from the IMU 5, which is sensed by the gyros of the IMU 5, is passed to the attitude matrix computation 401.

The body angular rates from the IMU 5, and the rotation rate vector of the local navigation frame (n frame) relative to the inertial frame (i frame) from the navigation computation 404, and the estimates of attitude errors from the integrated Kalman filter 60 are received by the attitude matrix computation 402 and are used to update an attitude matrix and remove attitude errors. The way to update attitude matrix is Euler method, or the direction cosine method, or the quaternion method.

The attitude matrix is output by the attitude matrix computation 401 to the attitude angle computation 403 and is used to extract the pitch, roll, and yaw angle from the attitude matrix, which is the part of the INS solution.

The acceleration from the accelerators of the IMU 5, which is expressed in the body frame (b frame), and the attitude matrix from the attitude matrix computation 401 are received by the attitude matrix 402. The input acceleration expressed in body frame is transformed by the attitude matrix 401 to the acceleration expressed in the navigation frame (n frame), which is output to the navigation computation 404.

The acceleration expressed in the navigation frame from the attitude matrix 402 and the estimate of position errors and velocity errors from the integrated Kalman filter are received by the navigation computation 404, and are used to compute the position and velocity, and to remove the errors of the position and velocity, and to compute the rotation rate vector of the local navigation frame (n frame) relative to the inertial frame (i frame).

The position and velocity as part of INS solution are output by the navigation computation 404 to the integrated Kalman filter 60. The rotation rate vector of the local navigation frame (n frame) relative to the inertial frame (i frame) is output by the navigation computation 404 to the attitude computation 401.

It is well-known that the real-time Kalman filter produces optimal estimates with well defined statistical properties. The estimates are unbiased and they have minimum variance within the class of linear unbiased estimates. The quality of the estimates is however only guaranteed as long as the assumptions underlying the mathematical model hold. Any misspecification in the model may invalidate the results of filtering and thus also any conclusion based on them. It is therefore very important to have novel ways to verify the validity of the assumed mathematical model. Especially in the GPS/IMU integrated navigation system applications, the key to successful development of a real-time Kalman filter is to generate a filter model of adequate size to predict the actual system performance and at the same time operate within the processor throughput constraints. In the fully-coupled kinematic GPS/IMU algorithm (FCKGA) design, the filter must also be robust enough to operate in more than one dynamical environment because the integrated navigation system based on the FCKGA algorithm will be applied to a wide class of military/civilian moving platforms, such as tactical munitions, unmanned airborne vehicles, smart bombs, precision strike weapons and avionics platforms. If the dynamics change drastically, or if a sensor failure occurs, for example, a GPS satellite signal failure or an inertial sensor signal failure, the filter must detect, rectify and isolate the failure situation, and finally reconfigure the integrated navigation algorithm by use of some mechanism.

These notions or concepts of filter integrity and robustness are fully coupled even though they are generally considered independently. A robust filter has the characteristic that it provides near-optimum performance over a large class of process and measurement models. The Kalman filter is not robust since it is optimal for only one particular process and measurement model. If the filter is not correct the filter covariance may report accuracies which are different from what can actually be achieved. The purpose of filter integrity is to ensure that the predicted performance from the error covariance is close to the actual estimation error statistics.

In addition, filter divergence is usually caused by a changing process or measurement model or a sensor failure. Residual monitoring schemes can efficiently detect hard and soft failures and filter divergence. One benefit of the residual monitoring approach is that when the filter model is correct, the statistical distribution of the residual sequence is known. Thus, it is easy to generate a measurement editing and divergence detection scheme using a test-of-distribution on the measurement residuals. The same statistics can be used to assess the filter tuning and adjust the size of the covariance when divergence is detected.

Since the residual statistics are normalized by the projection of the state error covariance onto the measurement geometry, the error covariance must be accurate, or at least conservative, in order to maintain a reasonable false alarm rate. This requires that all known measurement errors be properly modeled and that the process model be fairly accurate. A reduced-order filter known as the Schmidt-Kalman filter is applied which allows certain states that are known to be present to be considered without being estimated. This filter leads to accurate uncertainties on the states which are estimated. This filter also has a wider region of convergence since certain non-linear effects can be included in the measurement error model.

It is an important technical core in the FCKGA that the development of a multi-mode integrated navigation Kalman Filter/estimator with robustness performs IMU in-flight alignment and error drift correction, and navigation solution using kinematic GPS/IMU data. All raw measurements processed by data fusion and failure detection and isolation techniques are sent into the multi-mode integration Kalman filter together with some command instructions. Therefore, several preprocessing functions in addition to the multi-mode filter design must be performed first. These functions include GPS/IMU failure detection, identification and isolation so that reliable measurement data can be provided to the multi-mode navigation filter. In turn the accurate output of the multi-mode filter can be utilized to make corrections for failure analyses.

Figure 10:
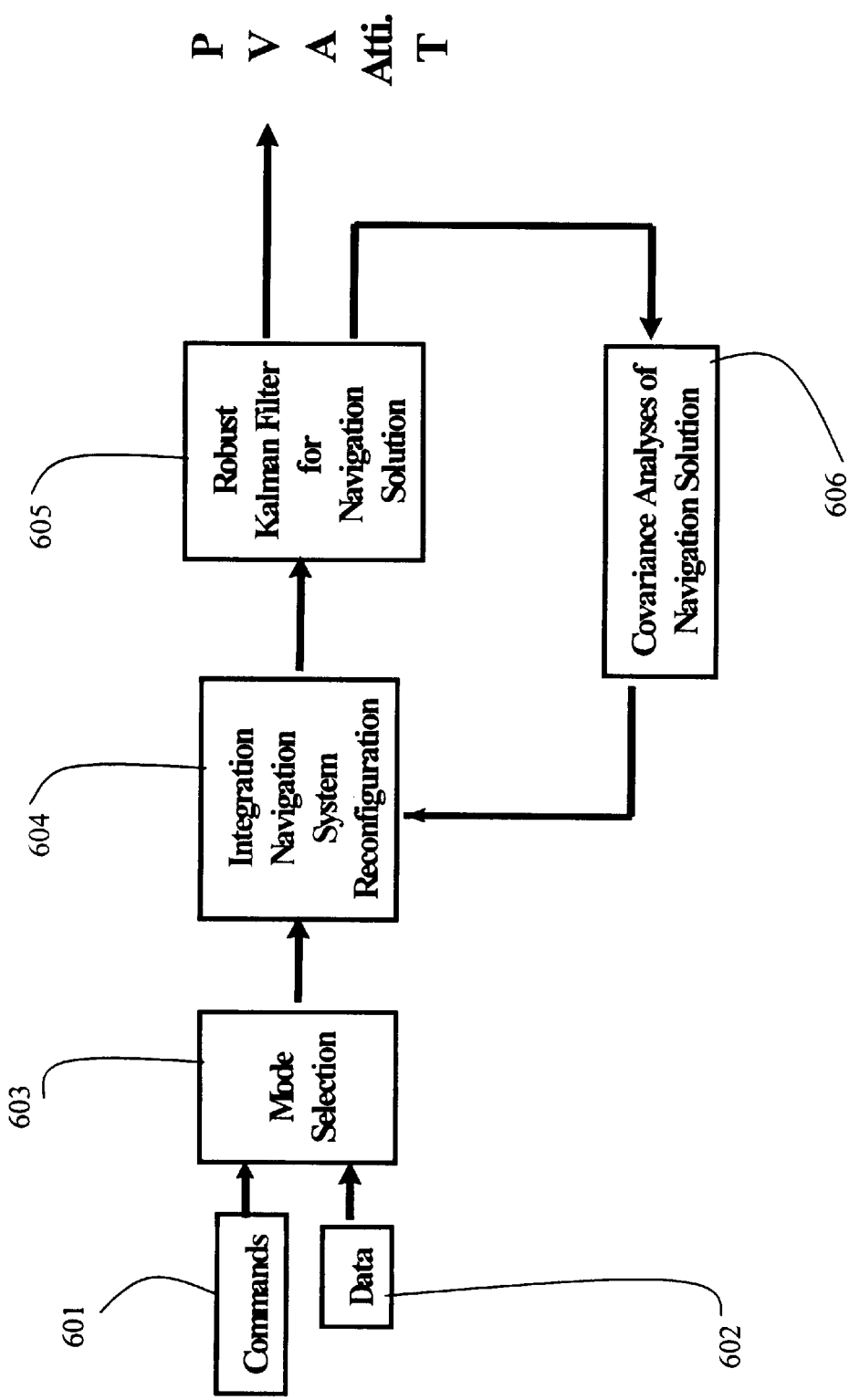
FIG. 10 is a block diagram illustrating the integrated Kalman filter structure.

Referring to FIG. 10, in step 4, robust statistics and estimation are used for covariance analyses of the navigation solution 606 in order to provide P-V-A aiding information, system reconfiguration commands and reliable navigation solution. The development of a novel algorithm for failure analysis can efficiently detect, isolate and compensate satellite signal failures or IMU sensor failures, and allow the system to provide satisfactory navigation and guidance signals for the control of a vehicle.

The forced mode select commands and filter parameters from the human-machine interface are received and interpreted by the commands 601. The meaning of the commands and parameters is output by the commands 601 to the mode selection 603.

The GPS measurements form the ambiguity resolution 50, GPS ephesians from the message decoding 30, and the INS solution from the navigation solution 40 are received and passed by the data 602 to the mode selection 603.

The meaning of the forced mode select commands and filter parameters and the all measurements of GPS and INS are received by the mode selection 603. Based on the forced mode select commands and filter parameters and the availability of the all measurements of GPS and INS, a current operation mode of the fully-coupled positioning is made by the mode selection 603. The corresponding system model and measurement mode, and measurements of the filter are passed by the mode selection 603 to the integration navigation system reconfiguration 604. The operation modes which the mode selection 603 may select are:

(1) GPS/INS P-V (position and velocity )integration mode;
(2) GPS/IMU $\rho/\Delta v+\Delta\theta$ (pseudorange and delta range) integration mode without aiding of GPS tracking loops;
(3) GPS/IMU $\rho/\Delta v+\Delta\theta$ (pseudorange and delta range) integration mode with aiding of GPS tracking loops;
(4) GPS/IMU $\rho+\phi/\Delta v+\Delta\theta$ (pseudorange, delta range, and carrier phase) integration mode without aiding of GPS tracking loops;
(5) GPS/IMU $\rho+\phi/\Delta v+\Delta\theta$ (pseudorange, delta range, and carrier phase) integration mode with aiding of GPS tracking loops.

The system model and measurement mode, and measurements of the filter from the mode selection 603 are received by the integration navigation system reconfiguration 604 and the discrete operation of system model and linearizing of measurement model are performed. The covariance matrix of system process is adjusted by the integration navigation system reconfiguration 604 based on the results of measurement residues monitoring from the covariance analyses of navigation solution 606, and passed to the robust Kalman filter for the navigation solution 605.

The discrete system model and linearized measurement model, the adjusted covariance matrix of system process and the formed measurements from the integration navigation system reconfiguration 604 are received by the robust Kalman filter for the navigation solution 605.

Optimal estimates of the errors of INS navigation parameters, inertial sensor, and PS measurement, are made by the robust Kalman filter for the navigation solution 605 sing the received data and passed to the navigation solution 40. The navigation system solution and optimal estimates of INS navigation parameter errors and GPS measurement errors are output by the robust Kalman filter for the navigation solution 605 to the ambiguity resolution 50. The measurements residues and the covariance of the system process are output by the robust Kalman filter for the navigation solution 605 to the covariance analyses of navigation solution 606. The navigation solution such as position, velocity, attitude, and time is output by the robust Kalman filter for the navigation solution 605.

The robust Kalman filter is implemented in full-order Kalman filter or reduced-order Kalman filter, such as Schmidt Kalman filter.

If the robust Kalman filter for navigation solution 605 is assigned to the GPS/INS P-V integration mode, a stand-alone GPS solution processing is included in the robust Kalman filter for navigation solution 605 to obtain GPS-derived position and velocity. The stand-alone GPS solution processing may be implemented with point solution algorithms or a Kalman filtering algorithm.

The filter measurements residues and the covariance of the system process from the robust Kalman filter for the navigation solution 605 are received by the covariance analyses of the navigation solution 606 receives, and are used to perform filter divergence testing. Based on the results of the filter divergence testing, the adjusting value of the covariance of the system process are output by the covariance analyses of the navigation solution 606 to the integration navigation system reconfiguration 604 to maintain the filter stability.

Figure 11:
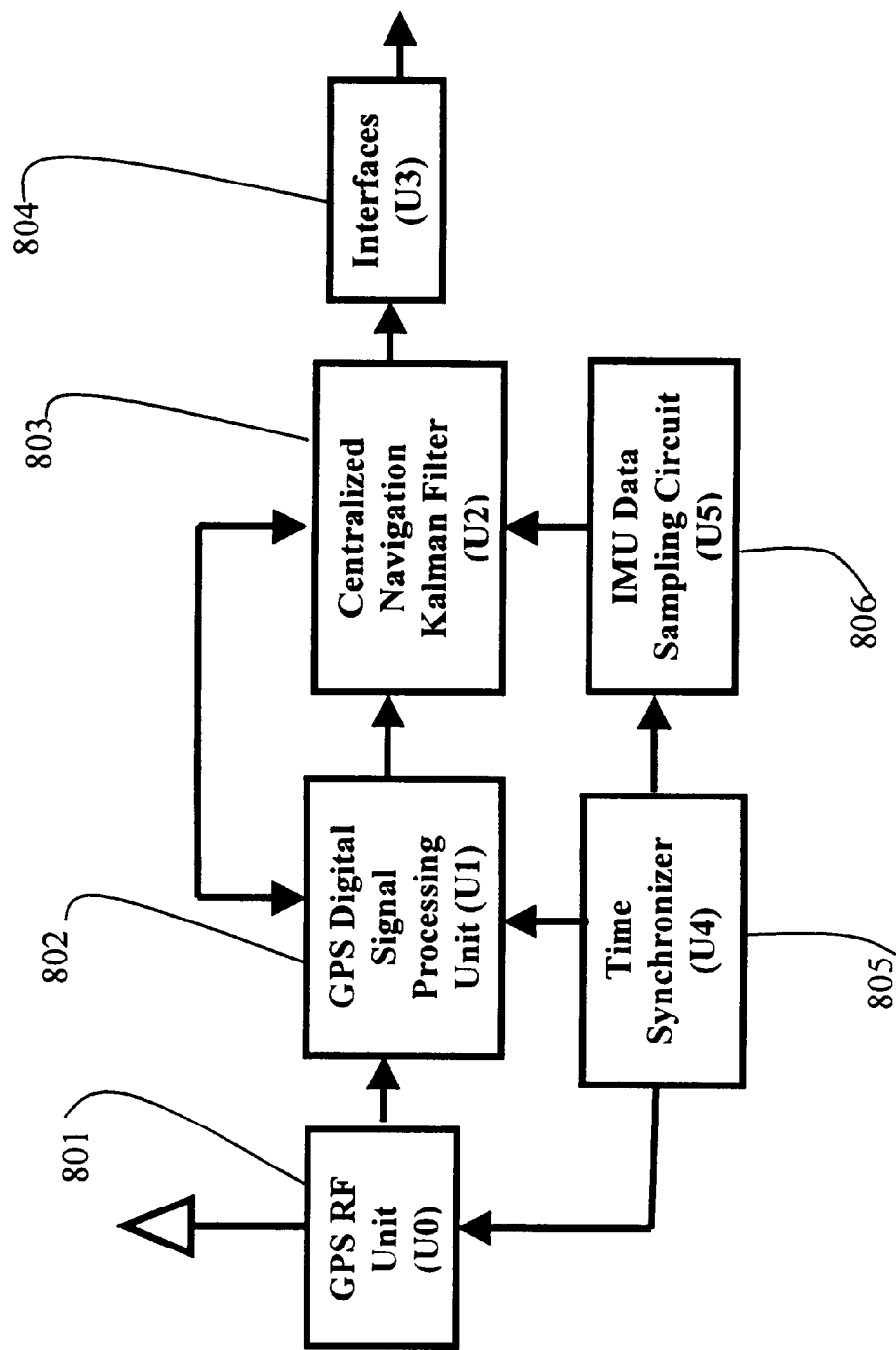
FIG. 11 is a block diagram illustrating the filly-coupled positioning system structure.

Referring to FIG. 11, the fully-coupled positioning system of the present invention comprises the following devices:

(1) A GPS RF unit 801 for receiving the GPS RF signals.
(2) A GPS digital signal processing unit 802 for processing incoming GPS signal and obtaining GPS measurements
(3) A IMU data sampling unit 806 for collecting the measurements from a IMU
(4) A Centralized navigation Kalman filter 803 for receiving and processing the measurements from the IMU and the GPS
(5) Interfaces 804 for realizing the data and control communication with other avionics systems.
(6) A time sychronizer 805 for providing the time signal and local reference signal to the other devices.

The GPS RF unit 801 receives the RF signals transmitted by GPS satellites, and then amplifies and down converts them into the IF signals. The GPS digital signal processing unit 802 digitizes the IF signals, carries out DLL and PLL with external IMU V-A aiding and decodes the navigation message implemented in a DSP (digital signal processor) processor and outputs are raw measurements and the navigation message. The centralized navigation Kalman filter 803 is the heart of the integrated navigation system, which performs the navigation solution by use of the robust Kalman filtering technique and dynamically calibrates IMU errors. In addition, the acceleration and velocity information is fedback to the GPS digital processing unit 802 for aiding the GPS receiver code and carrier tracking loops in order to improve the dynamics of GPS receiving unit. The time sychronizer 805 is a frequency reference providing a local RF reference for the GPS RF unit and synchronous control frequency and signal for the GPS digital signal processing unit 802 and the IMU Data sampling circuit 806. The IMU data sampling circuit 806 is an IMU data sampling and converter unit. The interfaces 804 realize the data and control communication with other avionics systems.

The GPS RF unit 801 connects directly with the GPS digital signal processing unit 802 and the time synchronizer 805 through a connector, such as a cable, and including the following means:

A. A GPS antenna or multipy-GPS antenna to receive GPS signals transmitted by GPS satellites.
B. A RF-IF converter, which is connected between the GPS antenna and the GPS digital signal processing unit 802 and is connected with the time synchronizer 805 to obtain local reference signal, to convert down the GPS RF signal from the GPS antenna to the GPS IF signal input to the GPS digital signal processing unit 802.

An amplifier may be connected between the GPS antenna and the RF-IF converter to improve signal-noise ratio (SNR) of incoming GPS signal.

The GPS Digital signal processing unit 802 is connected between the GPS RF unit 801 and the Centralized navigation Kalman filter 803. Meanwhile, the time synchronizer 805 is connected to the GPS digital signal processing unit 802 to provide time signal. The GPS digital signal processing unit 802 includes the following means:

A. An A/D converter, which is connected between the RF-IF converter of the GPS RF unit 801 and a DSP processor, to sample the GPS IF signal from RF-IF converter of the GPS RF unit 801.

B. A DSP processor, which is connected between the A/D converter and the centralized navigation Kalman Filter 803, to track and process the GPS digital signal to obtain GPS measurements input to the centralized navigation Kalman Filter 803.

An IF-Baseband converter may be connected between the RF-IF converter of the GPS RF unit 801 and the A/D converter to further convert down the GPS IF signal from the RF-IF converter of the GPS RF unit 801 to the GPS baseband signal input to the A/D converter.

The centralized navigation Kalman filter 803 is a microprocessor, which is connect with the GPS digital signal processing unit 802 and the interfaces 804 and the IMU data sampling circuit 806, to process the GPS measurements form the GPS digital signal processing unit 802 and IMU measurements from the IMU data sampling circuit 806.

The interfaces 804 are connected with the centralized navigation Kalman filter 803 to realize communication with other avionics systems, and may have many types, including:

(1) Serial signal interface, including synchronous communication interface and asynchronous communication interface, such as RS-232 interface, RS-422 interface, RS-485 interface, and etc.
(2) Parallel digital signal interface.
(3) Network adapter, such as NE2000 adapter.
(4) Bus interface, such as MIL-1553 interface and ARIC 429 interface.

The IMU data sampling circuit 806 is connected with the centralized navigation Kalman filter 803 and the time synchronizer 805 and may have many types, includes (1) D/A converter-based circuit, which is used to adapt an IMU with analog output.
(2) Pulse/counter-based circuit, which is used to adapt an IMU with pulse output.
(3) Serial digital signal communication-based circuit, which is used to adapt an IMU with serial digital signal interface.
(4) Parallel digital signal communication-based circuit, which is used to adapt an IMU with parallel digital signal interface.
(5) Network adapter-based circuit, which is used to adapt an IMU with network standard output.
(6) Bus interface-based circuit, which is used to adapt an IMU with a bus standard output interface.

If the processing capability of the micro-processor of the GPS digital signal processing unit 802 and the centralized navigation Kalman filter 803 is enough big, the centralized navigation Kalman filter 803 may be removed or the microprocessor of the GPS digital signal processing unit 802 may be removed. Then, the operation tasks of the centralized navigation Kalman filter 803 may be assigned to the microprocessor of the GPS digital signal processing unit 802, or, operation tasks of the micro-processor of the GPS digital signal processing unit 802 may be assigned to the centralized navigation Kalman filter 803.

In developing advanced IMU, a microprocessor is embedded in the electronic circuit of the IMU to improve the performance of IMU and to adapt new inertial sensors. Further, If the processing capability of the microprocessor of the IMU is enough big, the operation tasks of the centralized navigation Kalman filter 803 may be assigned to the microprocessor of the IMU.

The architecture of the connection among the GPS digital processing unit 802, the centralized navigation Kalman filter 803, the interfaces 804, the IMU data sampling circuit 806 and the time synchronizer 805 may have the following types:

(1) Bus-based connection structure
(2) Communication port-based connection structure
(3) Network-based connection structure.

What is claim is:

1. A positioning system for a vehicle, comprising:

a global positioning system (GPS) radio frequency (RF) unit for receiving global positioning system (GPS) radio frequency (RF) signals, amplifying said GPS RF signals and down converting said GPS RF signals into intermediate frequency (IF) signals;

a GPS digital signal processing unit for sampling said IF signal and deriving GPS pseudorange, delta range, and carrier phase measurements;

an IMU data sampling unit for collecting angular rate and acceleration measurements of said vehicle from an inertial measurement unit (IMU);

a centralized navigation Kalman filter for receiving and processing said GPS pseudorange, delta range, and carrier phase measurements for said GPS and said angular rate and acceleration measurements from said IMU;

at least an interface which is a serial signal interface, including synchronous communication interface and asynchronous communication interface, for realizing said data and control communication with other avionics systems, wherein said interface is connected with said centralized navigation Kalman filter to realize communication with said avionics systems; and a time synchronizer for providing said time signal and local reference signal to said avionics system devices.

2. A positioning system for a vehicle, comprising:

a global positioning system (GPS) radio frequency (RF) unit for receiving global positioning system (GPS) radio frequency (RF) signals, amplifying said GPS RF signals and down converting said GPS RF signals into intermediate frequency (IF) signals;

a GPS digital signal processing unit for sampling said IF signal and deriving GPS pseudorange, delta range, and carrier phase measurements;

an IMU data sampling unit for collecting angular rate and acceleration measurements of said vehicle from an inertial measurement unit (IMU);

a centralized navigation Kalman filter for receiving and processing said GPS pseudorange, delta range, and carrier phase measurements for said GPS and said angular rate and acceleration measurements from said IMU;

at least an interface, which is a parallel digital signal interface, for realizing said data and control communication with other avionics systems, wherein said interface is connected with said centralized navigation Kalman filter to realize communication with said avionics systems; and a time synchronizer for providing said time signal and local reference signal to said avionics system devices.

3. A positioning system for a vehicle, comprising:

a global positioning system (GPS) radio frequency (RF) unit for receiving global positioning system (GPS)

radio frequency (RF) signals, amplifying said GPS RF signals and down converting said GPS RF signals into intermediate frequency (IF) signals;

a GPS digital signal processing unit for sampling said IF signal and deriving GPS pseudorange, delta range, and carrier phase measurements;

an IMU data sampling unit for collecting angular rate and acceleration measurements of said vehicle from an inertial measurement unit (IMU);

a centralized navigation Kalman filter for receiving and processing said GPS pseudorange, delta range, and carrier phase measurements for said GPS and said angular rate and acceleration measurements from said IMU;

at least an interface, which is a network adapter, for realizing said data and control communication with other avionics systems, wherein said interface is connected with said centralized navigation Kalman filter to realize communication with said avionics systems; and a time synchronizer for providing said time signal and local reference signal to said avionics system devices.

4. A positioning system for a vehicle, comprising:

a global positioning system (GPS) radio frequency (RF) unit for receiving global positioning system (GPS) radio frequency (RF) signals, amplifying said GPS RF signals and down converting said GPS RF signals into intermediate frequency (IF) signals;

a GPS digital signal processing unit for sampling said IF signal and deriving GPS pseudorange, delta range, and carrier phase measurements;

an IMU data sampling unit for collecting angular rate and acceleration measurements of said vehicle from an inertial measurement unit (IMU);

a centralized navigation Kalman filter for receiving and processing said GPS pseudorange, delta range, and carrier phase measurements for said GPS and said angular rate and acceleration measurements from said IMU;

at least an interface, which is a bus interface, for realizing said data and control communication with other avionics systems, wherein said interface is connected with said centralized navigation Kalman filter to realize communication with said avionics systems; and a time synchronizer for providing said time signal and local reference signal to said avionics system devices.

5. A positioning system for a vehicle, comprising:

a global positioning system (GPS) radio frequency (RF) unit for receiving global positioning system (GPS) radio frequency (RF) signals, amplifying said GPS RF signals and down converting said GPS RF signals into intermediate frequency (IF) signals;

a GPS digital signal processing unit for sampling said IF signal and deriving GPS pseudorange, delta range, and carrier phase measurements;

an IMU data sampling unit, which is a pulse/counter-based circuit for adapting said IMU with pulse output, for collecting angular rate and acceleration measurements of said vehicle from an inertial measurement unit (IMU);

a centralized navigation Kalman filter for receiving and processing said GPS pseudorange, delta range, and carrier phase measurements for said GPS and said angular rate and acceleration measurements from said IMU;

at least an interface for realizing said data and control communication with other avionics systems; and a time synchronizer for providing said time signal and local reference signal to said avionics system devices, wherein said IMU data sampling circuit is connected with said centralized navigation Kalman filter and said time synchronizer.

6. The positioning system, as recited in claim 1, wherein said IMU data sampling circuit, which is connected with said centralized navigation Kalman filter and said time synchronizer, is a serial digital signal communication-based circuit for adapting said IMU with said serial digital signal interface.

7. The positioning system, as recited in claim 2, wherein said IMU data sampling circuit, which is connected with said centralized navigation Kalman filter and said time synchronizer, is a parallel digital signal communication-based circuit for adapting said IMU with said parallel digital signal interface.

8. The positioning system, as recited in claim 3, wherein said IMU data sampling circuit, which is connected with said centralized navigation Kalman filter and said time synchronizer, is a network adapter-based circuit for adapting said IMU with said network adapter which is a network standard output.

9. A positioning system for a vehicle, comprising:

a global positioning system (GPS) radio frequency (RF) unit for receiving global positioning system (GPS) radio frequency (RF) signals, amplifying said GPS RF signals and down converting said OPS RF signals into intermediate frequency (IF) signals;

a GPS digital signal processing unit for sampling said IF signal and deriving GPS pseudorange, delta range, and carrier phase measurements;

an IMU data sampling unit, which is an A/D converter-based circuit for adapting said IMU with analog output, for collecting angular rate and acceleration measurements of said vehicle from an inertial measurement unit (IMU);

a centralized navigation Kalman filter for receiving and processing said GPS pseudorange, delta range, and carrier phase measurements for said GPS and said angular rate and acceleration measurements from said IMU;

at least an interface for realizing said data and control communication with other avionics systems; and a time synchronizer for providing said time signal and local reference signal to said avionics system devices, wherein said IMU data sampling circuit is connected with said centralized navigation Kalman filter and said time synchronizer.

10. The positioning system, as recited in claim 4, wherein said IMU data sampling circuit, which is connected with said centralized navigation Kalman filter and said time synchronizer, is a bus interface-based circuit for adapting said IMU with said bus interface which is a bus standard output interface.

11. A positioning system for a vehicle, comprising:

a global positioning system (GPS) radio frequency (RF) unit for receiving global positioning system (GPS) radio frequency (RF) signals, amplifying said GPS RF signals and down converting said GPS RF signals into intermediate frequency (IF) signals;

a GPS digital signal processing unit for sampling said IF signal and deriving GPS pseudorange, delta range, and carrier phase measurements;

an IMU data sampling unit for collecting angular rate and acceleration measurements of said vehicle from an inertial measurement unit (IMU);

a centralized navigation Kalman filter for receiving and processing said GPS pseudorange, delta range, and carrier phase measurements for said GPS and said angular rate and acceleration measurements from said IMU;

at least an interface for realizing said data and control communication with other avionics systems; and a time synchronizer for providing said time signal and local reference signal to said avionics system devices, wherein said architecture of said connection among said GPS digital processing unit, said centralized navigation Kalman filter, said interface, said IMU data sampling circuit and said time synchronizer is a bus-based connection structure.

12. A positioning system for a vehicle, comprising:

a global positioning system (GPS) radio frequency (RF) unit for receiving global positioning system (GPS) radio frequency (RF) signals, amplifying said GPS RF signals and down converting said GPS RF signals into intermediate frequency (IF) signals;

a GPS digital signal processing unit for sampling said IF signal and deriving GPS pseudorange, delta range, and carrier phase measurements;

an IMU data sampling unit for collecting angular rate and acceleration measurements of said vehicle from an inertial measurement unit (IMU);

a centralized navigation Kalman filter for receiving and processing said GPS pseudorange, delta range, and carrier phase measurements for said GPS and said angular rate and acceleration measurements from said IMU;

at least an interface for realizing said data and control communication with other avionics systems; and a time synchronizer for providing said time signal and local reference signal to said avionics system devices, wherein said architecture of said connection among said GPS digital processing unit, said centralized navigation Kalman filter, said interface, said IMU data sampling circuit and said time synchronizer is a communication port-based connection structure.

13. A positioning system for a vehicle, comprising:

a global positioning system (GPS) radio frequency (RF) unit for receiving global positioning system (GPS) radio frequency (RF) signals, amplifying said GPS RF signals and down converting said GPS RF signals into intermediate frequency (IF) signals;

a GPS digital signal processing unit for sampling said IF signal and deriving GPS pseudorange, delta range, and carrier phase measurements;

an IMU data sampling unit for collecting angular rate and acceleration measurements of said vehicle from an inertial measurement unit (IMU);

a centralized navigation Kalman filter for receiving and processing said GPS pseudorange, delta range, and carrier phase measurements for said GPS and said angular rate and acceleration measurements from said IMU;

at least an interface for realizing said data and control communication with other avionics systems; and a time synchronizer for providing said time signal and local reference signal to said avionics system devices, wherein said architecture of said connection among said GPS digital processing unit, said centralized navigation Kalman filter, said interface, said IMU data sampling circuit and said time synchronizer is a network-based connection structure.

14. A positioning process for a vehicle, comprising said steps of:

(a) accepting angular rate and acceleration measurements for said vehicle from an inertial measurement unit (IMU) to form an initial value and computing said initial value according to inertial navigation equations of said inertial measurement unit, and accepting vehicle position, velocity, and attitude measurements from at least an external sensor, and that said inertial measurement unit is a tactical munition inertial measurement unit installed on a launch platform, wherein measurements or navigation parameters of said tactical munition inertial measurement unit and said launch platform inertial measurement unit are filtered by an alignment filter to provide optimal initialization information to said tactical munition inertial measurement unit;

(b) receiving global positioning system (GPS) radio frequency (RF) signals and deriving GPS pseudorange, delta range, and carrier phase measurements from said global positioning system radio frequency signals;

(c) receiving said angular rate and acceleration information from said inertial measurement unit and solving said inertial navigation measurements of said inertial measurement unit to obtain a navigation solution which includes position, velocity, and attitude; and (d) combining said GPS pseudorange, delta range, and carrier phase measurements, and said navigation solution to obtain a fully-coupled positioning solution.

15. The positioning process, as recited in claim 14, wherein, in step (a), said external sensor is a global positioning system receiver, wherein position and velocity of said global positioning system receiver, an inaccurate initial attitude value first as an initial value of said navigation equations of said inertial measurement unit, and an accurate alignment of said inertial measurement unit are further performed using signals of said global positioning system receiver.

16. The positioning process, as recited in claim 15, wherein in step (b), said global positioning system radio frequency signals are tracked by a carrier phase locked loop and a code tracking loop of said global positioning system receiver, and that processes in said carrier phase locked loop and said code tracking loop of said global positioning system receiver are aided by said fully-coupled positioning solution obtained from said step (d).

17. The positioning process, as recited in claim 16, wherein, in step (c), errors of said inertial navigation solution are removed with optimal estimates of said errors of said inertial navigation solution obtained from step (d).

18. The positioning process, as recited in claim 17, after step (b), further comprising an additional step of performing a carrier phase integer ambiguity resolution and cycle slip detection to incorporate said GPS carrier phase measurements to step (d).

19. The positioning process, as recited in claim 18, after step (b), further comprising an additional step of aiding said carrier phase integer ambiguity resolution and cycle slip detection with said fully-coupled positioning solution obtained from said step (d).

20. A positioning process for a vehicle, comprising said steps of:

(a) accepting angular rate and acceleration measurements for said vehicle from an inertial measurement unit (IMU) to form an initial value and computing said initial value according to inertial navigation equations of said inertial measurement unit;

(b) receiving global positioning system (GPS) radio frequency (RF) signals and deriving GPS pseudorange, delta range, and carrier phase measurements from said global positioning system radio frequency signals;

(c) receiving said angular rate and acceleration information from said inertial measurement unit and solving said inertial navigation measurements of said inertial measurement unit to obtain a navigation solution which includes position, velocity, and attitude; and (d) combining said GPS pseudorange, delta range, and carrier phase measurements, and said navigation solution to obtain a fully-coupled positioning solution, wherein said GPS pseudorange, delta range and carrier phase measurements, and said inertial navigation solution are combined by an integrated Kalman filters.

21. The positioning process, as recited in claim 19, wherein, in step (d), said GPS pseudorange, delta range and carrier phase measurements, and said inertial navigation solution are combined by an integrated Kalman filters.

22. A positioning process for a vehicle, comprising said steps of:

(a) accepting angular rate and acceleration measurements for said vehicle from an inertial measurement unit (IMU) to form an initial value and computing said initial value according to inertial navigation equations of said inertial measurement unit;

(b) receiving global positioning system (GPS) radio frequency (RF) signals and deriving GPS pseudorange, delta range, and carrier phase measurements from said global positioning system radio frequency signals;

(c) receiving said angular rate and acceleration information from said inertial measurement unit and solving said inertial navigation measurements of said inertial measurement unit to obtain a navigation solution which includes position, velocity, and attitude; and (d) combining said GPS pseudorange, delta range, and carrier phase measurements, and said navigation solution to obtain a fully-coupled positioning solution, wherein GPS pseudorange, delta range and carrier phase measurements, and said inertial navigation solution are combined by a multi-mode robust Kalman filter which comprises at least one of said following operation modes:

a GPS/INS P-V (position and velocity) integration mode;

a GPS/IMU $\rho/\Delta v+\Delta\theta$ (pseudorange and delta range) integration mode without aiding of GPS tracking loops;

a GPS/IMU $\rho/\Delta v+\Delta\theta$ (pseudorange and delta range) integration mode with aiding of GPS tracking loops;

a GPS/IMU $\rho+\phi/\Delta v+\Delta\theta$ (pseudorange, delta range, and carrier phase) integration mode without aiding of GPS tracking loops; and a GPS/IMU $\rho+\phi/\Delta v+\Delta\theta$ (pseudorange, delta range, and carrier phase) integration mode with aiding of GPS tracking loops.

23. The positioning process, as recited in claim 21, wherein, in step (d), said GPS pseudorange, delta range and carrier phase measurements, and said inertial navigation solution are combined by a multi-mode robust Kalman filter which comprises at least one of said following operation modes:

a GPS/INS P-V (position and velocity) integration mode;

a GPS/IMU $\rho/\Delta v+\Delta\theta$ (pseudorange and delta range) integration mode without aiding of GPS tracking loops;

a GPS/IMU $\rho/\Delta v+\Delta\theta$ (pseudorange and delta range) integration mode with aiding of GPS tracking loops;

a GPS/IMU $\rho+\phi/\Delta v+\Delta\theta$ (pseudorange, delta range, and carrier phase) integration mode without aiding of GPS tracking loops; and a GPS/IMU $\rho+\phi/\Delta v+\Delta\theta$ (pseudorange, delta range, and carrier phase) integration mode with aiding of GPS tracking loops.

24. The positioning process, as recited in claim 21, wherein said body angular rate and acceleration information from said inertial measurement unit is processed in said inertial navigation solution, and is passed to said integrated Kalman filter, wherein error estimates, which are provided by the integrated Kalman filter, are fed back to said inertial navigation solution to remove errors of the position, velocity and inertial sensors, wherein said GPS RF signals are received by a GPS antenna and processed in said GPS RF/IF Unit, said carrier and code tracking loops, said ambiguity resolution and said message decoding being passed to said integrated Kalman filter, wherein optimal velocity and acceleration information of said integrated Kalman filter are fed back to said carrier and code tracking loops to aid GPS signal tracking process, moreover position, velocity, attitude from said inertial navigation solution being input to an ambiguity resolution to aid a GPS carrier phase integer ambiguity resolution.

* * * * *

UNITED STATES PATENT AND TRADEMARK OFFICE
CERTIFICATE OF CORRECTION

PATENT NO. : 6,311,129 B1
DATED : October 31, 2001
INVENTOR(S) : Ching-Fang Lin

It is certified that error appears in the above-identified patent and that said Letters Patent is hereby corrected as shown below:

<u>Column 1</u>,
Before the "FIELD OF THE PRESENT INVENTION", insert the following paragraph:

-- Technical Field

This invention was made with Government support under Contract No. F0863097-C-0045 awarded by the Air Force Armament Directorate of Wright Laboratory (WL/MNAG), Eglin Air Force Base, FL 32542-6810. The Government has certain rights in the invention. --

Signed and Sealed this

Nineteenth Day of March, 2002

Attest:

JAMES E. ROGAN
*Director of the United States Patent and Trademark Office*

*Attesting Officer*